United States Patent [19]

Cummiskey

[11] 4,353,128

[45] Oct. 5, 1982

[54] SYNCHRONOUS/ASYNCHRONOUS DATA COMMUNICATION ARRANGEMENT

[75] Inventor: Peter Cummiskey, Clark, N.J.

[73] Assignee: Bell Telephone Laboratories, Incorporated, Murray Hill, N.J.

[21] Appl. No.: 161,203

[22] Filed: Jun. 19, 1980

[51] Int. Cl.³ .............................................. H04J 3/02
[52] U.S. Cl. ........................................ 370/44; 370/91
[58] Field of Search ................... 370/44, 110, 91, 10, 370/11, 8

[56] References Cited

U.S. PATENT DOCUMENTS

| 3,720,791 | 3/1973 | Yada et al. | 370/44 |
| 3,723,657 | 3/1973 | Muller | 370/44 |
| 3,748,393 | 7/1973 | Baxter | 370/55 |
| 3,761,621 | 9/1973 | Vollmeyer et al. | 370/44 |
| 3,862,369 | 1/1975 | Hessenmuller et al. | 370/44 |
| 3,984,632 | 10/1976 | Singer | 370/44 |

Primary Examiner—Douglas W. Olms
Attorney, Agent, or Firm—John A. Caccuro

[57] ABSTRACT

A data communication arrangement is disclosed for multiplexing an asynchronous binary data signal with a synchronous binary data signal by the timely insertion of an extra data bit in selected synchronous data words and by delaying the transmission of the resulting multiplexed data words. The extra data bit is generated when a binary level transition occurs in the asynchronous binary data signal. The transmission of the multiplexed data word is delayed a fixed amount of time relative to the binary level transition of the asynchronous signal to preserve the timing between transitions in the asynchronous signal. The received multiplexed data words are demultiplexed into a synchronous and asynchronous binary data signals. The demultiplexed asynchronous binary data signal emerges having transition timing which is the same as the transition timing of the original asynchronous binary data signal.

39 Claims, 15 Drawing Figures

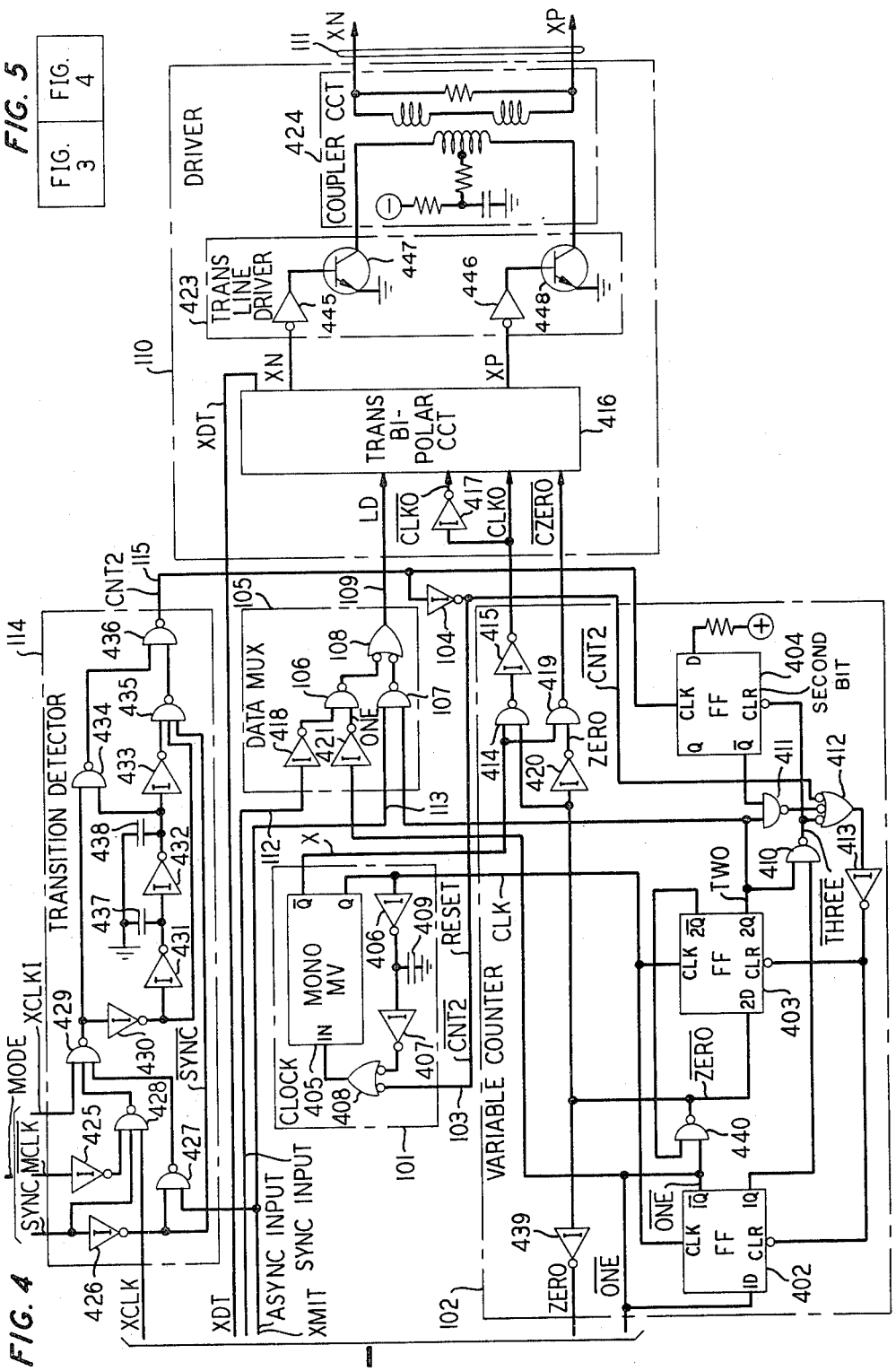

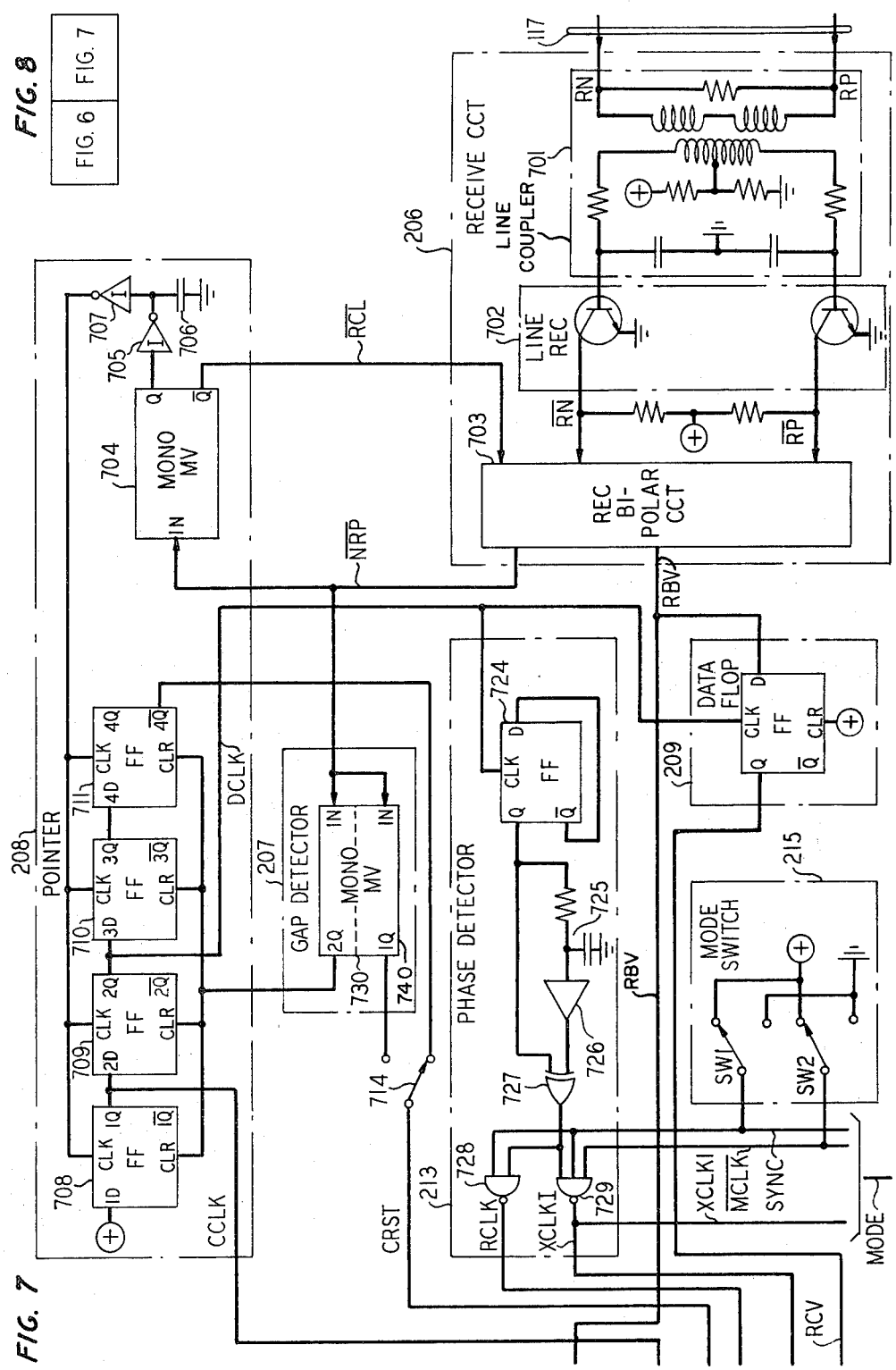

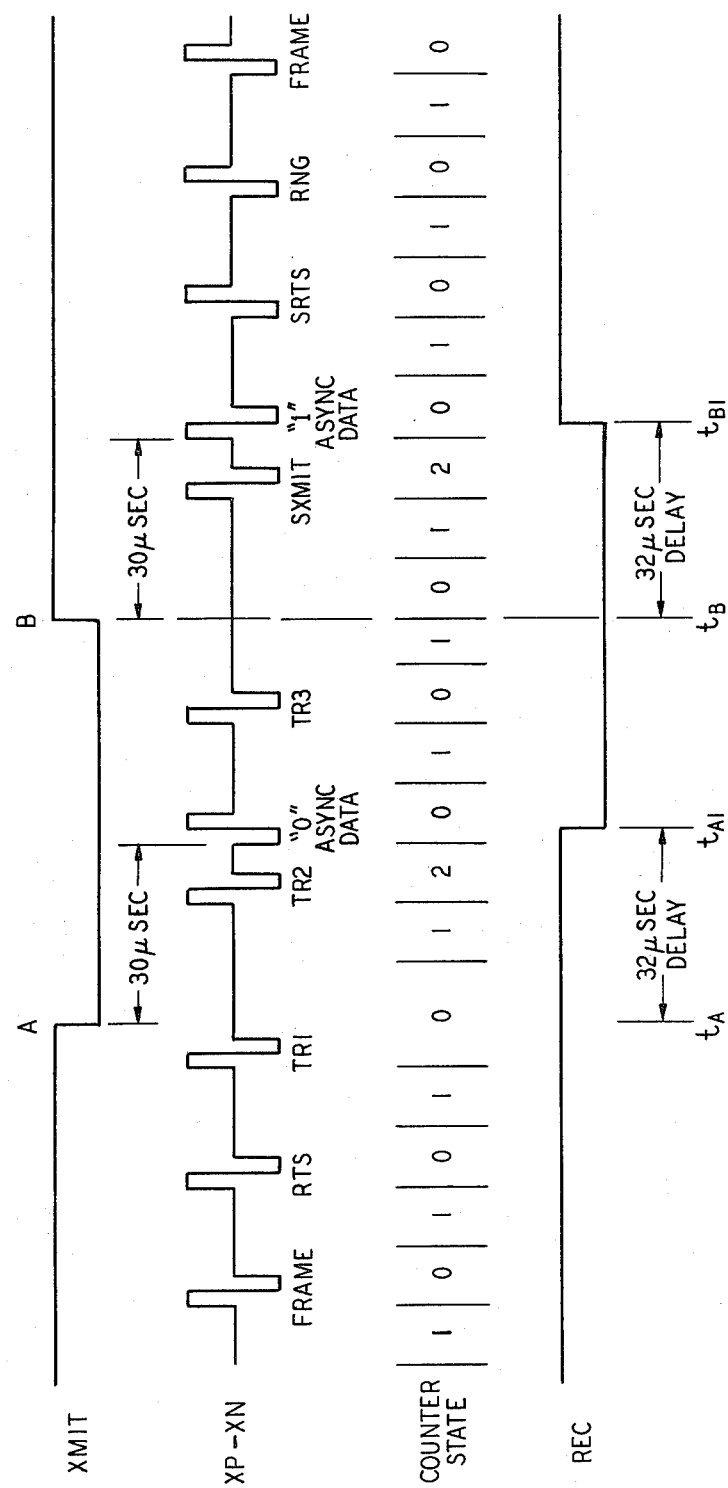

SYNCHRONOUS/ASYNCHRONOUS DATA COMMUNICATION ARRANGEMENT

TECHNICAL FIELD

This invention relates to a digital data communications arrangement and more particularly to a data communication arrangement which permits asynchronous and synchronous data signals to be multiplexed together for transmission as a common data signal.

BACKGROUND OF THE INVENTION

In digital data communication systems the transmission of data, from a transmitter circuit to a receiver circuit, requires timing information in order to properly interpret the received data. These data communication systems operate in either a synchronous or asynchronous mode.

In the synchronous mode signal transitions and timing occur at integral multiples of the bit length. Thus, the synchronous data signal source typically generates data words having a fixed length and fixed spacing between consecutive data words. In synchronous systems the timing information is conveyed to the receiver circuit by the data signal transitions, by sending one or more specific codes or by clock signals sent with the data transmission to the receiver circuit. The receiver circuit adjusts its synchronization circuits using this timing information to insure that the received signal is sampled when the data is in a stabilized state rather than when it is in a transition state. Thus, in these synchronous digital systems, all the data word timing and signal transitions occur in integer multiples of the bit time.

In asynchronous digital systems the data signal source typically generates data words in which the bit timing is asynchronous or synchronous within the data word and is asynchronous between the data words. Thus, the data words start at a non-uniform interval of time resulting in irregular spacing between consecutive data words. In these asynchronous digital systems the data word timing is preserved by utilizing extra bits, such as start bits, which are added to each data word to enable the synchronization of the receiver circuit to the received digital data. In other asynchronous data devices the protocol, the relative timing between the start bit and the data bits of the data signals, must be preserved during a data transmission. In this type of asynchronous device both the length of the data word as well as the spacing between consecutive data words are irregular. Thus, the preservation of the timing of data transmissions between such asynchronous devices becomes even more critical.

In digital communication systems which interconnect with both synchronous and asynchronous data devices it is required to provide a separate interface for each application. Thus it is a problem to provide one interface circuit in a digital communications system which can communicate both synchronous and asynchronous data signals.

Prior art communication arrangements include a method of transmitting asynchronous data bits in a synchronized data stream. For example, U.S. Pat. No. 3,748,393 issued to J. V. Baxter on July 24, 1973 discloses an arrangement for substituting asynchronous data bits for one data channel of a transmitted data bit stream. In the Baxter arrangement the location of a marker bit is utilized to indicate the number and repetition rate of the inserted asynchronous data bits. The Baxter patent, however, does not preserve the protocol timing of the asynchronous data signal.

In another arrangement, U.S. Pat. No. 3,723,657 issued to H. Muller on Mar. 27, 1973, a time multiplex transmission process maintains the transition timing as disclosed which is data signals up to a maximum transmission rate. In the Muller patent a sample of the binary data signal is transmitted at the maximum transmission rate of the system. In between data samples a counter counts the elapsed time from the previous transmitted sample of the binary signal. When a transition in the binary state of the signal occurs, the existing count of the counter is transmitted immediately after the next sample indicating when the change of state of the binary signal occurred. Thus, the receiver can determine, from the received counter data, the exact time between the samples when the signal changed binary state. The Muller patent, however, does not teach how to simultaneously transmit synchronous and asynchronous data signals over a data communication facility.

Thus, it is an existing problem in the art to design a data communication arrangement which simultaneously transmits asynchronous and synchronous data signals over a data facility and which is transparent to the timing of the asynchronous data signals.

SUMMARY OF THE INVENTION

The problem is solved in accordance with the present invention in which a data communication arrangement is disclosed for multiplexing an asynchronous binary data signal with a synchronous binary data signal such that the timing of the asynchronous binary data signal is preserved during transmission.

In the disclosed arrangement an asynchronous data bit is transmitted only when the signal from the connected asynchronous data source changes binary state. During the absence of a transition of the asynchronous signal the signal from a connected synchronous data source is transmitted as a series of synchronous data words each containing one bit. When a binary transition in the asynchronous signal occurs, an information bit representing the new binary state of the asynchronous signal is multiplexed as an extra bit in the next transmitted synchronous data word. The start of a transmission of the resulting composite two bit data word is delayed to occur at a fixed time after the transition timing of the asynchronous data signal. Hence, the start of transmission of each composite data word corresponds with and preserves the timing of each transition of the asynchronous data signal.

Thus, the data transmissions consist of one bit synchronous data word when only synchronous data is transmitted and composite two bit asynchronous data words when both synchronous and asynchronous data are transmitted. The timing between adjacent two bit data words represents the timing between the transitions in the asynchronous data signal. This multiplexing of the asynchronous data into selected delayed synchronous data words enables the disclosed system to preserve the timing of data transmissions from any type of asynchronous data device. The received multiplexed data words are demultiplexed and the asynchronous binary data separated from the synchronous binary data. The asynchronous binary data signal emerges having a transition timing which maintains the timing of the original asynchronous binary data signal.

Thus, it is a feature of the disclosed data communication arrangement to multiplex asynchronous data signals into synchronous data words and to retime the transmission of the resulting composite data word such that the transition timing of the asynchronous data signal is maintained during transmission to the receiver unit.

It is an additional feature of the disclosed data communication arrangement to control the multiplexing of the asynchronous and synchronous data signal and to control the timing of the resulting composite data word utilizing a variable counter means and clock means which have their timing resynchronized and the counting limit altered in response to the detection of a binary transition in the asynchronous data signal.

BRIEF DESCRIPTION OF THE DRAWINGS

The purpose and operation of the present invention, as well as additional objectives, advantages and features thereof, will be more fully appreciated from the illustrative embodiment shown in the drawing in which:

FIGS. 3 and 4 show the transmitter unit of the interface unit;

FIG. 5 shows the connection of FIG. 3 and FIG. 4;

FIGS. 6 and 7 show the receiver unit of the interface unit;

FIG. 8 shows the connection of FIG. 6 and FIG. 7;

FIG. 9 shows the asynchronous mode timing diagram;

GENERAL DESCRIPTION

Figure 1:
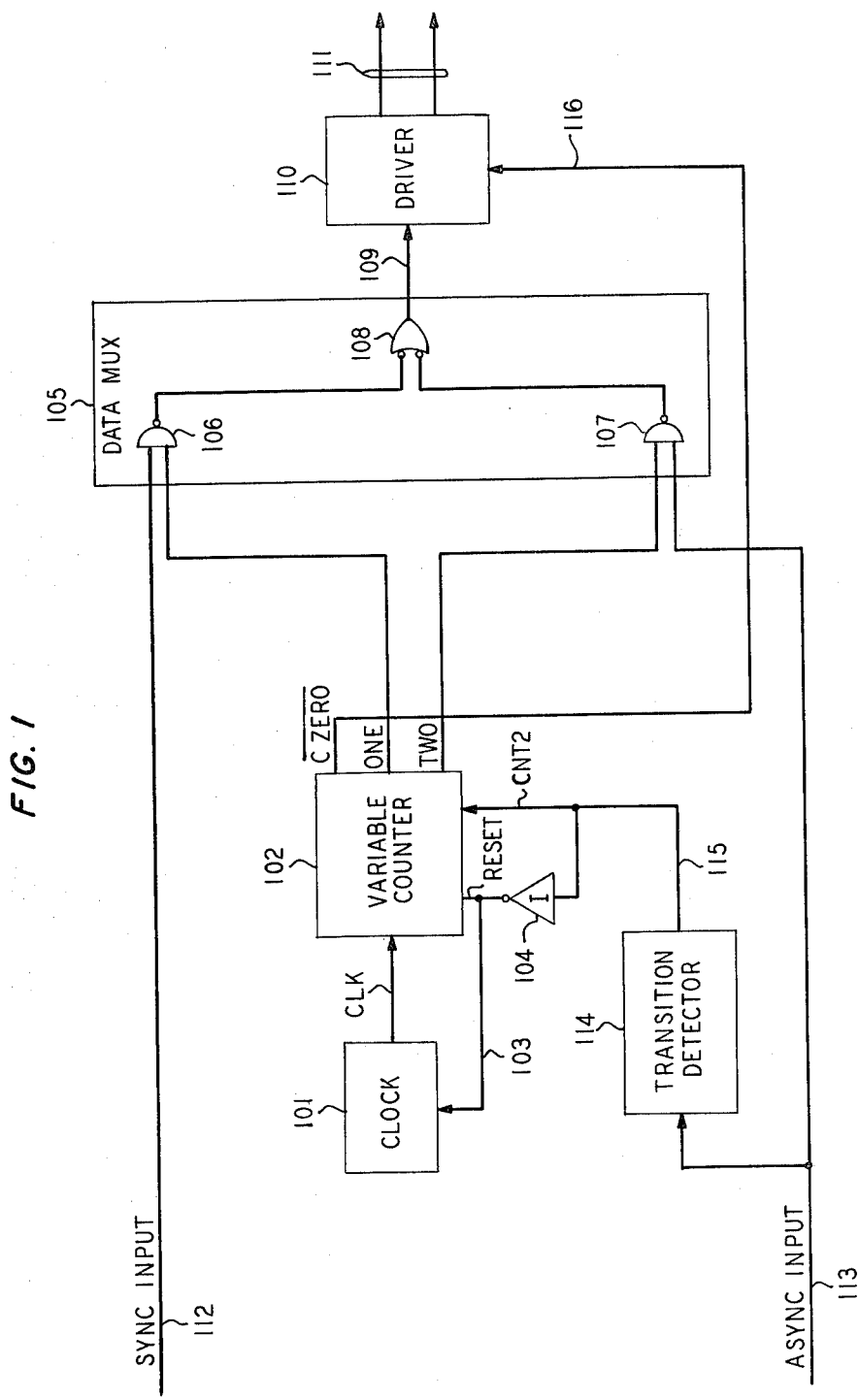
FIG. 1 shows a functional block diagram of a synchronous/asynchronous data communication arrangement.

Shown in FIG. 1 is a block diagram of the invention for multiplexing an asynchronous data signal with a synchronous data signal. A digital clock 101, which can be internal to the interface unit or externally supplied, is connected to variable counter circuit 102. Counter circuit 102 is arranged to cyclically count the clock pulses from digital clock 101. In the absence of a CNT2 signal on the lead 115 counter 102 cyclically counts between state zero and state one. Following the presence of a CNT2 signal on lead 115 counter 102 cyclically counts to state two. An inverted CNT2 signal (RESET) on lead 103 resets clock 101 so that all outputs are retimed to the event on CNT2.

Assuming no CNT2 pulse on lead 115 lead ONE goes high (logic 1) on every other clock pulse. Lead ONE is connected to NAND gate 106 of data multiplex circuit 105 which also includes NAND gate 107 and NOR gate 108. When counter 102 is at state zero, leads ONE and TWO are low (logic 0) and the outputs of gates 106 and 107 are high causing a low output from gate 108 disabled hence no signal is gated to lead 109. Driver circuit 110, which is connected to multiplex circuit 105 by lead 109, is arranged to give an output signal on facility 111 representative of logic 1 data, logic 0 data or "no" data. When enable lead 116 CZERO is logic 0, as during state zero of counter 102, a "no" data signal (zero volt start sequence) is outputted from driver circuit 110 to facility 111. When lead 116 is logic 1 an output signal representative of logic data on lead 109 is outputted on facility 111.

When counter 102 is at state one lead ONE is logic 1 and gate 106 and driver circuit 110 are enabled, while gate 107 is disabled. The synchronous binary input signal 112 is gated through gates 106 and 108 and outputted over facility 111 by driver circuit 110.

Asynchronous binary input signal 113 connects to transition detector 114 which produces a CNT2 signal on lead 115 only during transitions in the asynchronous binary input signal. When the asynchronous binary input signal on lead 113 is in transition from a logic 0 to a logic 1 or from logic 1 to logic 0, transition detector generates a logic 1 signal CNT2 on lead 115. The momentary logic signal CNT2 on lead 115 enables counter 102 to reach a state 2 count. At this time, lead TWO is logic 1 and the signal representing the transition timing of asynchronous input 113, is gated by gates 107 and 108, and outputted over facility 111 by driver circuit 110. When a binary transition in the asynchronous input signal on lead 113 occurs lead 115 also resets counter 102 and resynchronizes clock 101 via inverter 104. Clearing counter 102 on transitions of the asynchronous signal enables the timing of the next transmitted data word to be adjusted and delayed a fixed time from the binary transition of the asynchronous input signal. During these transitions counter 102 counts through state zero, state one and state two providing, respectively, a "no" data (gap) signal, a synchronous data bit and an asynchronous data bit for transmission over facility 111. In the absence of a binary transition on lead 113 counter 102 counts only state zero and state one permitting respectively a gap and a synchronous data bit to be transmitted over facility 111.

Figure 2:
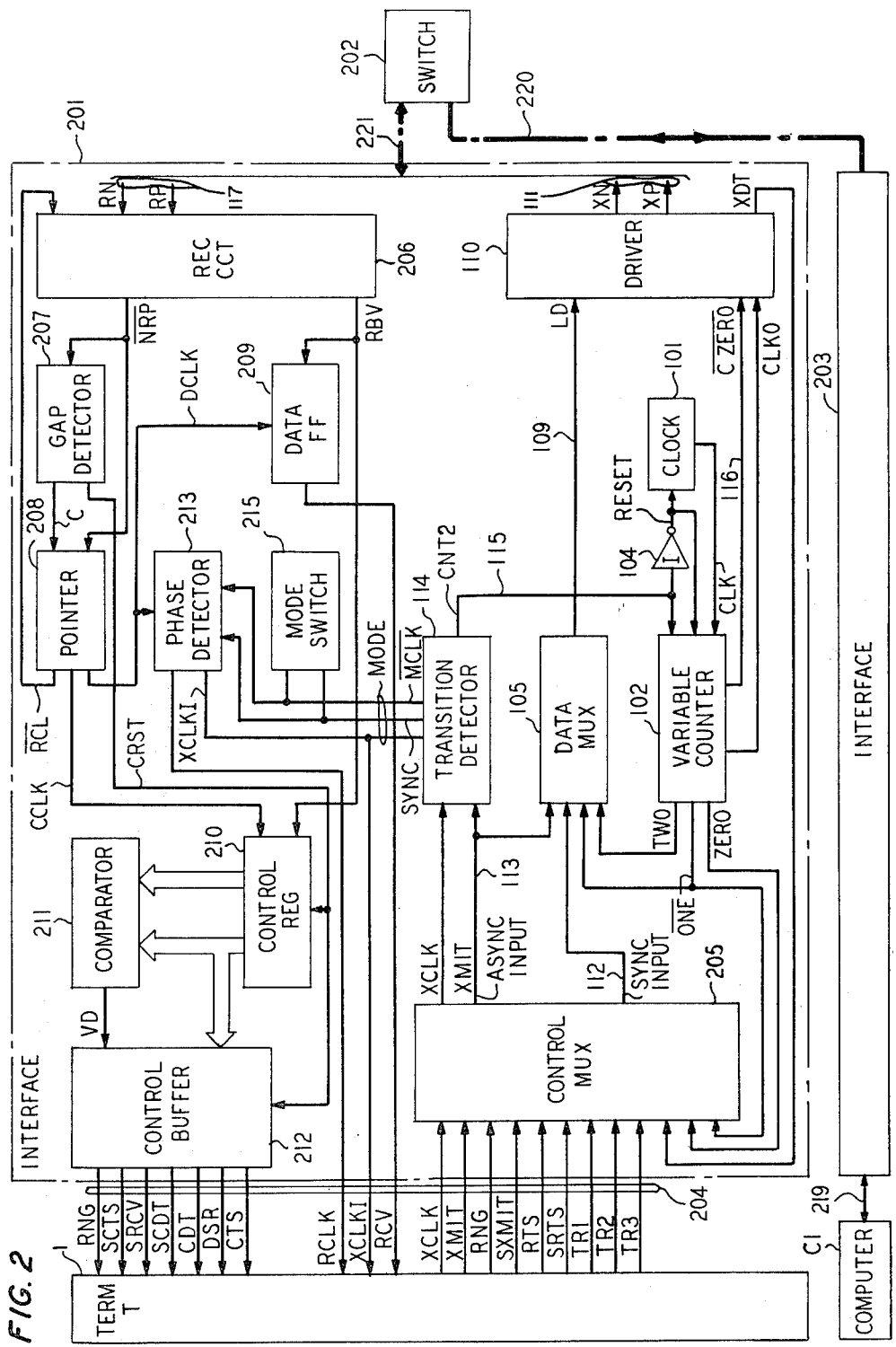
FIG. 2 shows a data communication system including multiple data terminals each connected to a data switch using an interface incorporating the synchronous/asynchronous data communication arrangement.

The preferred embodiment of the disclosed invention is described in detail in the following paragraphs. Shown in FIG. 2 is a block diagram of the invention implemented as an interface unit 201 which is used to interface a data device such as data terminal T to a network switch 202. In such an arrangement, data terminal T communicates through interface 201, facility 205 and network switch 202 to a computer system C1 or another data terminal located at interface 203. Of course, it is to be noted that data terminal T and the device to which it communicates must be compatible in data rate and use the same data communication format. It is also to be noted in FIG. 2 that units having like designation to units in FIG. 1 operate in the same manner.

Figure 3:
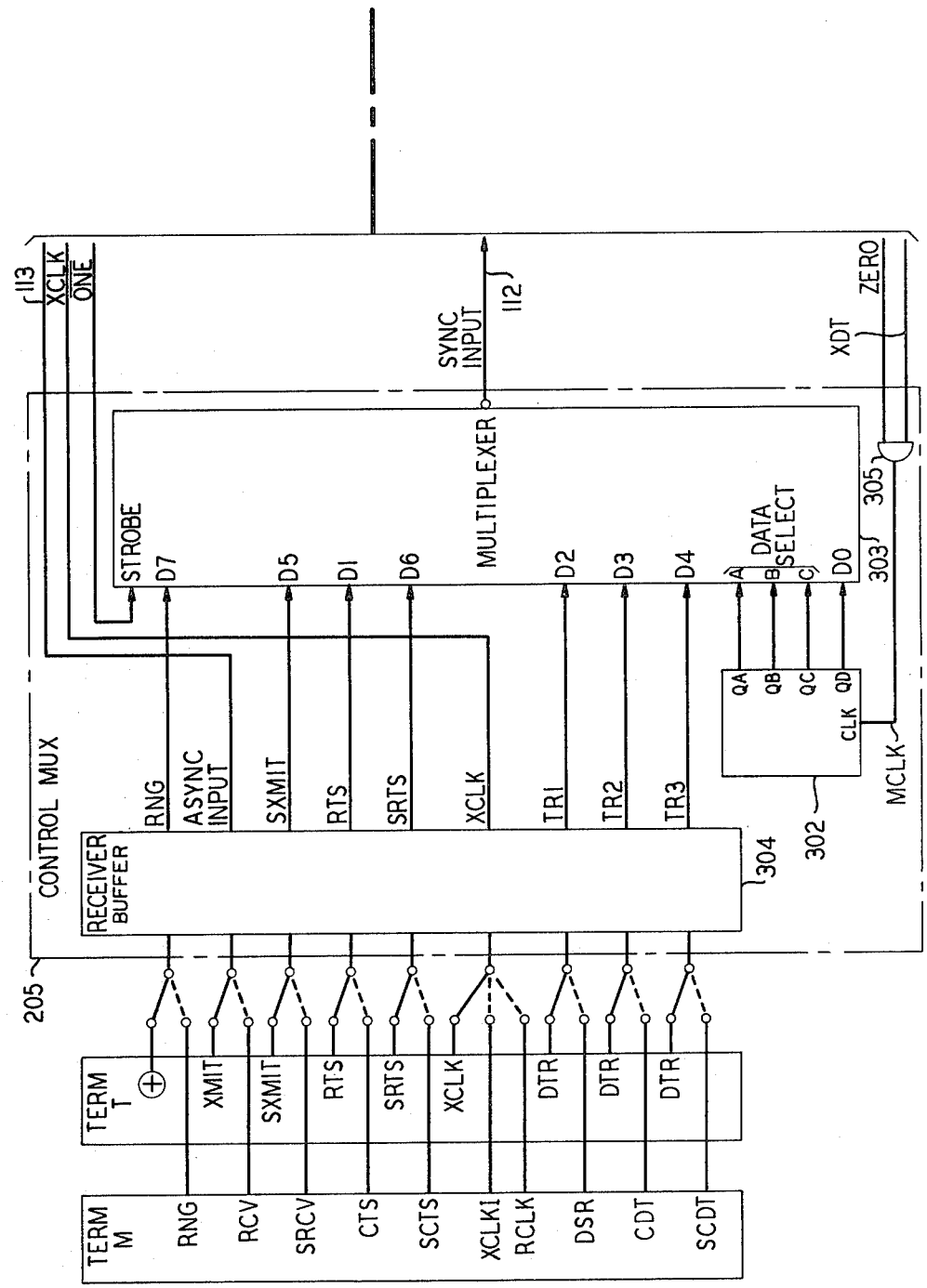
Figure 6:
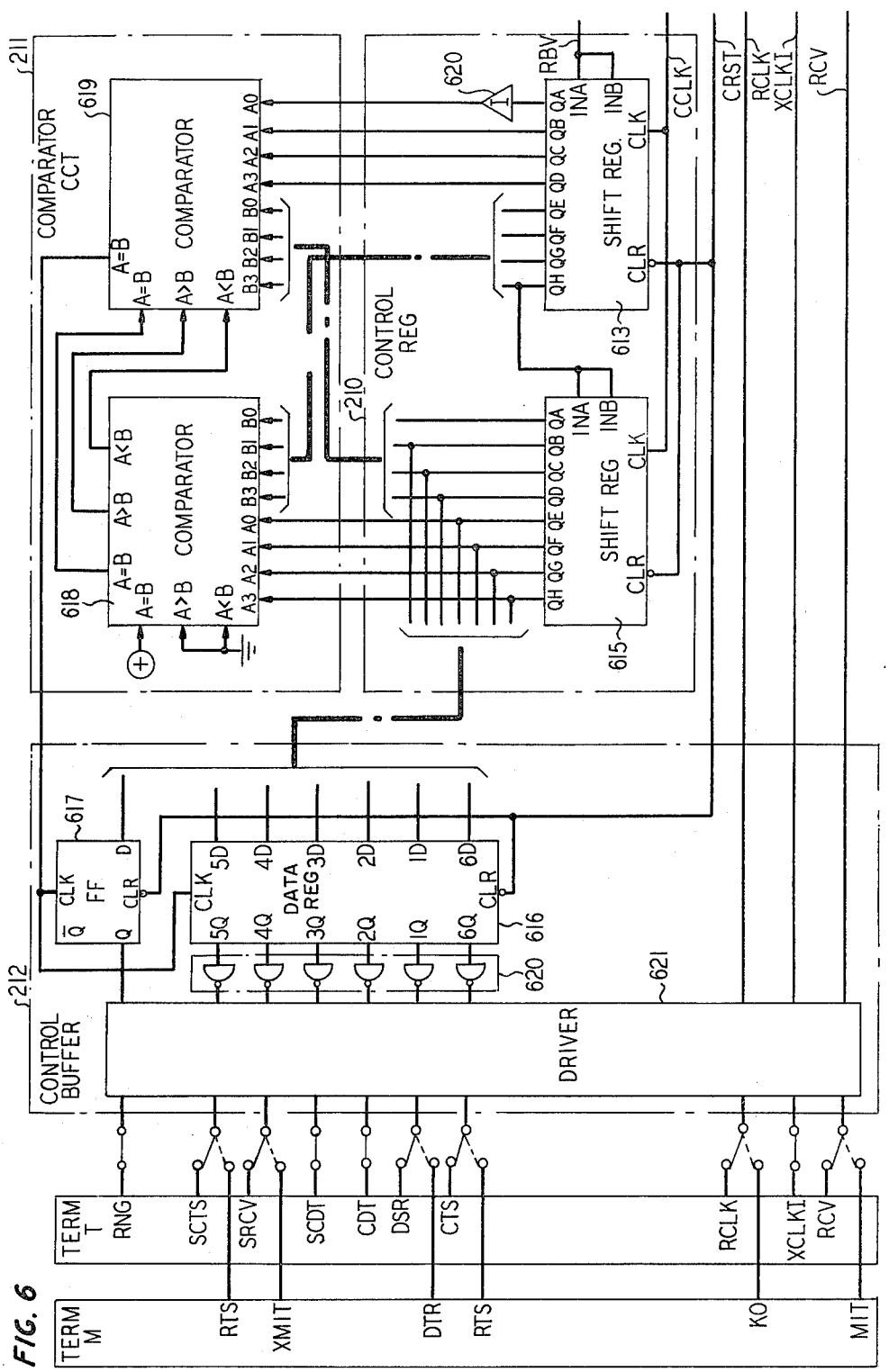

A typical terminal to computer connection through a switching system is shown in FIG. 2. Note, the circuitry required to establish the connection between a terminal T and computer C1 through switching network 202 is well known and is not discussed herein. Interfaces 201 and 203 at data terminal T and computer C1, respectively, convert the unbalanced, multiwire, RS232C signals on facilities 204 and 219 to balanced, 4 wire, full duplex signals on communication facilities 221 and 220 which terminate on ports of network switch 202. The RS232C compatible driver and receiver circuits in the interface units 201 and 203 were chosen to accommodate most of the terminals, modems and computer ports currently available in the market place. The definition of the RS232C signals are specified in the August, 1969 *EIA Standard RS232C* entitled "Interface Between Data Terminal Equipment and Data Communication Equipment Employing Binary Data Interchange". With reference to FIGS. 3 and 6, interface unit 201 is implemented for connection with two RS232C connector types, one type for terminals (TERM T) and one type for modems (TERM M). In FIGS. 3 and 6 interface unit 201 is shown connected to terminal (TERM T). Hence, interface unit 201 can connect to all standard RS232C devices which can communicate over hard wire connections provided the proper connectors are used.

As shown in FIG. 2, the transmitter portion of interface unit 201 consists of a control signal multiplexer 205, data multiplexer 105, transistion detector 114, clock 101, variable counter 102 and driver circuit 110. In this arrangement the signals RNG through TR3 connect into control multiplexer 205 from terminal T are slow speed input control signals. Control multiplexer 205 multiplexes these signals to provide the synchronous data input signal and the signal on lead XMIT provides the source of the asynchronous data input signal.

The receiver portion of interface unit 201 consists of receiver circuit 206, gap detector 207, pointer circuit 208, data flop 209, control register 210, comparator circuit 211, control buffer 212 and phase detector 213.

As noted earlier, interface unit 201 also includes a mode switch 215 which enables three operating modes including asynchronous, synchronous master and synchronous slave modes.

It should be noted that the term synchronous mode refers to the input data communications from the connected data terminal to interface 201. This synchronous input data, however, is only loosely synchronized with interface clock 101. Clock 101 is retimed with the receive clock (RCLK of terminal M of FIG. 3) signal during the synchronous-slave mode and retimed with the data terminals external clock (SCLK of terminal T of FIG. 3) signal inputted to interface 201 during the synchronous-master mode. Thus, every $n^{th}$ clock cycle the 100 KHz natural frequency of clock 101 is periodically retimed to be in sync with the signals RCLK or XCLK. Otherwise, the internal 100 KHz clock signal is not related to the external clocks or data signals.

The particular mode of operation of interface 201 is selected from the signals on the MODE leads. In the asynchronous mode asynchronous data on lead XMIT is clocked from interface 201 to facility 221 whenever a transition occurs on the XMIT lead. As noted previously, in FIG. 1, and as shown by data multiplexer 105, this occurs when state two of variable counter 102 is reached.

Every time variable counter 102 reaches state zero leads XDT and ZERO advance control multiplexer 205 thus selecting another input control signal for transmission. Thus, the input control signals into multiplexer 205 are multiplexed to provide synchronous input signal 112 which is synchronized with clock 101. Referring to FIG. 9, since the data transmission during any counter state does not begin until the end of that counter state the data as shown in waveform XP-XN are delayed by one counter state. Thus, the no data or "gap" in the data appears at counter state one and the synchronous data bit FRAME appears during counter state zero. The control data bit FRAME is generated within control multiplexer 205 once every 8 synchronous data bits and serves as a framing signal for each eight word frame of data. In the absence of a binary transition of the asynchronous signal on lead XMIT, control multiplexer 205 is advanced by signals on leads ZERO and XDT to select the next control bit (RTS) which is outputted on lead SYNC INPUT 112 during the end of state one (logic 1 on lead ONE). Data multiplexer 105 gates this synchronous control bit over lead 109 to driver 110 for transmission over the XP and XN transmit pair of facility 221. Note, referring to FIG. 9, that in the absence of a transition in asynchronous signal each transmitted word includes only one data bit.

When a binary transition in the asynchronous signal occurs on lead XMIT, at time A, transition detector 114 generates output signal CNT2 on lead 115 which causes variable counter 102 to count to state two. Since signal CNT2 also causes a RESET signal, clock 101 is resynchronized and variable counter 102 is reset to counter state zero. In the preferred embodiment a 100 KHz multivibrator is used as clock circuit 101. Note resetting counter 102 at time A of FIG. 9 results in an unusually long counter state zero.

The outputting of the asynchronous data bit "0" ASYNC bit does not occur until the end of counter state two some 30$\mu$ seconds later. The asynchronous signal XMIT is gated by lead TWO through data multiplexer 105, lead 109 and driver 110 for transmission over facility 221. Note that the asynchronous data bit transmitted is a logic 0 representing the new binary state of XMIT at time A of FIG. 9. The formation of the doublet pulses which represent each data bit of waveform XP-XN will be described in a later paragraph.

Note, assuming the connection has been made over switching network 202 to terminal T or computer C1 the reception of the signal at the interface would occur as follows. Assuming that interface 201 of FIG. 2 is at the receiving location data is received over leads RP and RN of facility 221. When the first pulse in a doublet arrives receive circuit 206 stores the information. When the second pulse of the doublet is received a clock signal $\overline{NRP}$ is outputted and the decoded data bit appears on lead RBV. The demultiplexed received signal is shown by waveform REC of FIG. 9 as occurring at a time (tA1) 2 $\mu$sec after (assuming no transmission delay through the facilities and switch network 202) it was transmitted as shown by waveform XP-XN.

Since the received data word contains a synchronous data bit (TR2) and an asynchronous data bit (0) demultiplexing is required. Gap detector 207 which includes a monostable circuit detects the absence of data between the data words by timing the interval between clock pulses $\overline{NRP}$. The detection of a gap is used to generate a clear signal C for pointer circuit 208. Data appearing on lead RBV is connected to data flip-flop 209 and control register 210. Pointer circuit 208 outputs a clock pulse CCLK to control register 210 after receiving the first clock pulse NRP. A clock pulse DCLK to data flip-flop 209 is outputted to indicate the reception of a second bit of a two bit data word. Clock pulse DCLK is outputted only if a second clock pulse $\overline{NRP}$ occurs before clear signal C from gap detector 207. If clear signal C arrives prior to the next clock pulse $\overline{NRP}$ pointer 208 is cleared and the next received bit is a control bit. Thus, all synchronous control data is received by control register 210 while asynchronous data is received by data flip-flop 209.

In the preferred embodiment all the synchronous control signals, other than the FRAME bit which alternates, are redundantly transmitted. Comparator 211 checks for seven redundant control bits and an alternating frame bit in each received frame of data. A valid data (VD) signal is outputted when a match is detected causing one frame of data to be transferred from control register 210 to control buffer 212. Control buffer 212 converts the signals into the RS232C format and outputs the signals to the receiving terminal. Likewise data flip-flop 209 outputs the received data over lead RCV.

When another transition in the asynchronous input signal XMIT occurs shown at time B of FIG. 9, clock 101 and variable counter 102 are again reset and variable counter 102 is enabled to count to state two. Once again the new binary state of signal XMIT, "1" in this instance, is transmitted as the asynchronous data bit of a two bit data word. This transmission occurs over the facility about 30 μseconds after time B. Note that the time interval between time A and time B is the same as the time interval between the "0" and "1" asynchronous data signal shown on the transmitted waveform XP-XN. Similarly, this timing is preserved when received as illustrated at times tA1 and tB1 of the received signal REC. It is to be noted that if transition B had occurred during the transmission of a control bit (during state 1), such transmission would be prematurely cut off in favor of the new two bit data word transmission. At the receiver unit, this partial transmission would be detected as an error and the data discarded.

The waveform XP-XN of FIG. 9 illustrates that the one bit synchronous data words have a uniform gap (approximately the width of counter states 0 and 1) between dajacent synchronous data words. FIG. 9 also illustrates that the generation of an asynchronous data bit results in a two bit asynchronous data word having a non-uniform gap separating it from the prior synchronous data word. The flexible gap timing enables the preservation of the transition timing of the asynchronous data signal when encoded into the two bit data word.

In the asynchronous mode described above, clock leads RCLK (receive clock) and XCLKI (transmit clock) of FIG. 2 are held low (logic 0) since these clock signals are not used.

In the synchronous-master mode, terminal T provides the master clock XCLK which is transmitted as the second data bit of each data word. Data is strobed out from interface 201 to facility 221 by the master clock XCLK of terminal T rather than on transitions on XMIT lead 113. In the synchronous-master mode lead XCLKI is held low. At the receiving interface, data is strobed out to the connected terminal on negative transitions of clock RCLK. Receive clock RCLK is derived from the received data pulses on lead DCLK using phase detector 213.

With reference to FIG. 2, the synchronous-slave mode interface 201 provides a master clock signal RCLK and terminal data is strobed in using receive clock RCLK. This master clock signal RCLK is fed into terminal T transmit circuitry through lead XCLKI.

With reference to FIG. 7 the particular mode of operation of the interface 201 is selected by mode select switches SW1 and SW2. When mode select switch SW1 is connected to the +5 V supply, the interface unit is in the synchronous mode. When select switch SW2 is connected to +5 V supply interface 201 is in the synchronous-slave mode and clock signal XCLKI is sent to terminal T. When select switch SW2 is connected to ground, interface 201 is in the synchronous-master mode and no clock signal XCLKI is generated since gate 729 is disabled. When select switch SW1 is connected to the ground position, the interface unit 201 is in the asynchronous mode. No SCLKI or RCLK signals are generated since gates 729 and 728 are disabled.

DETAILED DESCRIPTION

Transmitter Circuit FIGS. 3 and 4

Assuming mode select switch SW1 of FIG. 7 is in the asynchronous position the transmission of data signals from interface 201 occurs in the following manner. With reference to time slot A of FIG. 9, we note that the asynchronous signal lead XMIT is at a logic 1 level and the variable counter 102 is at state 0. As shown in FIG. 4 variable counter circuit 102 consists of flip-flops 402 and 403 which are made to count to a variable state by D type flip-flop 404 and the associated logic gates. Note that the integrated circuits specified in the following description are of the type or equivalent to those specified in table 1 located on the last page of the specification. Additionally, the application of power and ground voltages as well as the biasing of unused leads has not been shown on the various integrated circuit chips.

Clock 101 includes a retriggerable monostable multivibrator 405 wired such that when its output Q returns to logic 0, a pulse is fed back through inverter gates 406, 407 and NOT OR gate 408 to input IN of monostable 405. The resistor and capacitor of monostable 405 (not shown) are selected such that clock 101 operates at a 100 KHz clock rate. Capacitor 409 connected between inverter gates 406 and 407 creates a delay in the feedback signal which provides the retrigger pulse for monostable 405. Lead $\overline{CNT2}$ provides another input to OR gate 408 which triggers monostable 405 when a pulse from transition detector 114 arrives.

Output Q of monostable 405 drives the two stage counter consisting of D type flip-flops 402 and 403. Flip-flop 402 has its output $\overline{1Q}$ connected to its input 1D. Output $\overline{1Q}$ of flip-flop 402 together with output $\overline{2Q}$ of flip-flop 403 connect to NAND gate 440 whose output connects to input 2D of flip-flop 403.

Assuming flip-flops 402 and 403 are cleared outputs $\overline{1Q}$ and $\overline{2Q}$ are logic 1 and hence input 2D is at logic 0 and lead ZERO at logic 1. This condition represents state zero of variable counter 102. When monostable 405 is retriggered from NOT OR gate 408, output Q goes from logic 0 to logic 1 causing flip-flop 402 to set and its output $\overline{1Q}$ and lead ZERO to become logic 0. The lead ZERO becoming logic 0 through inverter 439 and gate 440. Thus, after one clock pulse from monostable 405 state one is reached (lead ONE is logic 1). When monostable 405 is retriggered again a second clock pulse from monostable 405 causes flip-flop 402 to reset since lead $\overline{ONE}$ is logic 0. Since output $\overline{ZERO}$ of gate 440 was at a logic 1 flip-flop 403 is set on the second clock pulse from monostable 405. Thus flip-flop 403 is set and flip-flop 402 is cleared. Thus lead TWO is at logic 1, while lead $\overline{ONE}$ is at logic 1 and lead ZERO is at logic 0 representing state two of variable counter 102.

Flip-flop 404 is a type D variety which is clocked from a signal on lead CNT2 from transition detector 114. When a transition is detected by transition detector 114 lead CNT2 goes from logic 0 to logic 1. This condition sets flip-flop 404 indicating that a second data bit is to be transmitted as part of the data word from terminal T. In the absence of an output from transition detector 114 flip-flop 404 is in a cleared state and its inputs $\overline{Q}$ is logic 1. Thus, the output of gate 411 which connects to lead TWO and lead $\overline{Q}$ of flip-flop 404 causes an output of logic 0. The logic 0 output of gate 411 connects to an input of the three input NOT OR gate 412 causing its output to be at logic 1. Inverter 413 connects to the output of gate 412 and clears flip-flops 402 and 403. Thus, to recapitulate, when there is no output from transition detector 114, variable counter 102 counts through state zero and state one and immediately resets to state zero when state two is momentarily reached.

Assuming that a two bit data word is to be transmitted the signal output on lead CNT2 from transition detector 114 sets flip-flop 404 and gate 411 is disabled by the logic 0 from lead $\overline{Q}$. Thus flip-flop 402 and 403 do not receive a logic 0 on their CLR leads from inverter 413 when counter 102 reaches state two. With clock and variable counter circuit 102 at state two the next clock pulse from clock 101 sets flip-flop 402. Since flip-flop 403 was previously set, the setting of flip-flop 402 causes the connected NAND gate 410 output lead $\overline{\text{THREE}}$ to be logic 0 indicating state three. The lead $\overline{\text{THREE}}$ connects to an input of NOT OR gate 412 and resets flip-flop 402, 403 and 404. Thus, when a two bit data word is to be transmitted from data terminal T, variable counter 102 counts from state zero through state two and resets to state zero as soon as state three is momentarily reached. Output lead CLKO from variable counter 102 is derived from NAND gate 414 and inverter 415 and provides a narrow clock pulse during the end of counter state zero which clock pulse is used to enable line driver 110.

Figure 10:
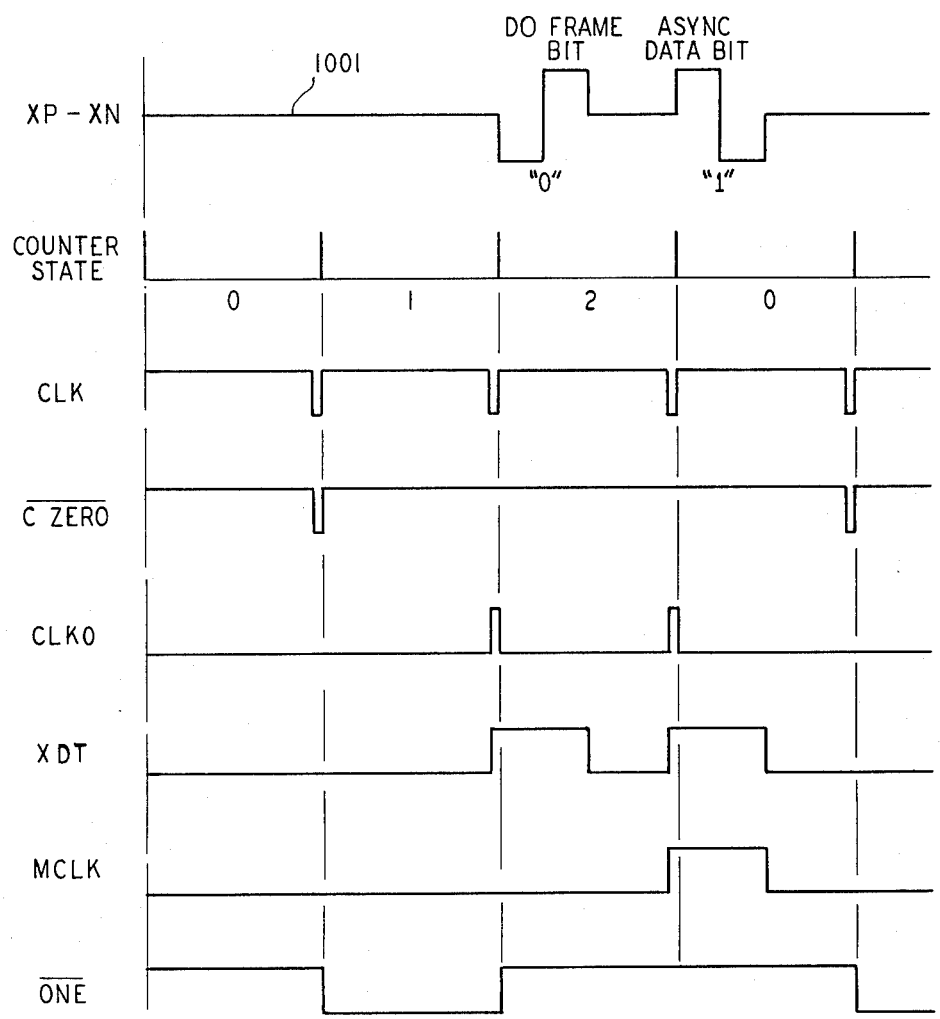
FIG. 10 shows the detailed transmitter timing for a two bit data word.

With reference to FIG. 10, pulse CLKO is shown occurring during the last instant of counter state one. The lead XDT is an output of transmit bipolar circuit 416 which becomes logic 1 when lead $\overline{\text{CLKO}}$ goes to logic 0 as a result of the signal on lead CLKO being inverted by inverter 417. The operation of bipolar pulse generating circuit 416 is described in a later paragraph of this specification.

Referring to FIG. 3 lead XDT and lead ZERO are connected to AND gate 305 to provide a clock pulse to counter 302. The generation of this clock pulse is shown on FIG. 10 as signal MCLK. Counter circuit 302 is a well known 4 bit counter circuit as listed in table 1 of the specification. The outputs QA, QB and QC of counter 302 are connected to the data select leads A, B and C of control signal multiplexer 303. Multiplexer 303 functions to cyclically select one of its inputs D0–D7. These inputs include signals from receiver buffer 304 or lead QD of counter 302 which are transmitted as the synchronous data bits from interface 201. Receiver buffer 304 is a well known circuit arranged to convert RS232C logic level signals to +5 V logic signals. Output QD of counter 302 is connected to data lead D0 of multiplexer 303. The input signal D0 is a toggling frame bit which changes logic level every time lead QD of counter 302 changes state. Thus, on every eighth MCLK pulse the frame data on lead D0 changes logic level.

Assuming the outputs of counter 302 are all at logic 0 the input signal D0 (which is logic 0) appears inverted at lead SYNC INPUT of multiplexer 303 when strobe signal $\overline{\text{ONE}}$ becomes logic 0. The timing of signal $\overline{\text{ONE}}$ is as shown in FIG. 10.

Referring to FIGS. 3 and 4, the signal D0 on lead SYNC INPUT 112 is inverted by gate 418 and gated with the ONE signal in NAND gate 106 of data multiplexer 105. The output of gate 106 is connected through NOT OR gate 108 of data multiplexer 105 to bipolar circuit 416. As shown on the XP-XN waveform of FIG. 10, generator 416 generates a doublet signal composed of two 2 μsec pulses. Note the output of circuit 416 is a balanced signal across leads XP and XN which connect to transmit line driver 423 whose balanced output drives leads XP and XN of facility 111 through a well known coupler circuit 424. Line driver 423 consists of inverters 445 and 446 which drive transistors 447 and 448 respectively. As shown in FIG. 10 since frame bit D0 was at logic zero the initial pulse of the doublet is negative (XP<XN) followed by a positive pulse (XP>XN).

Figure 11:
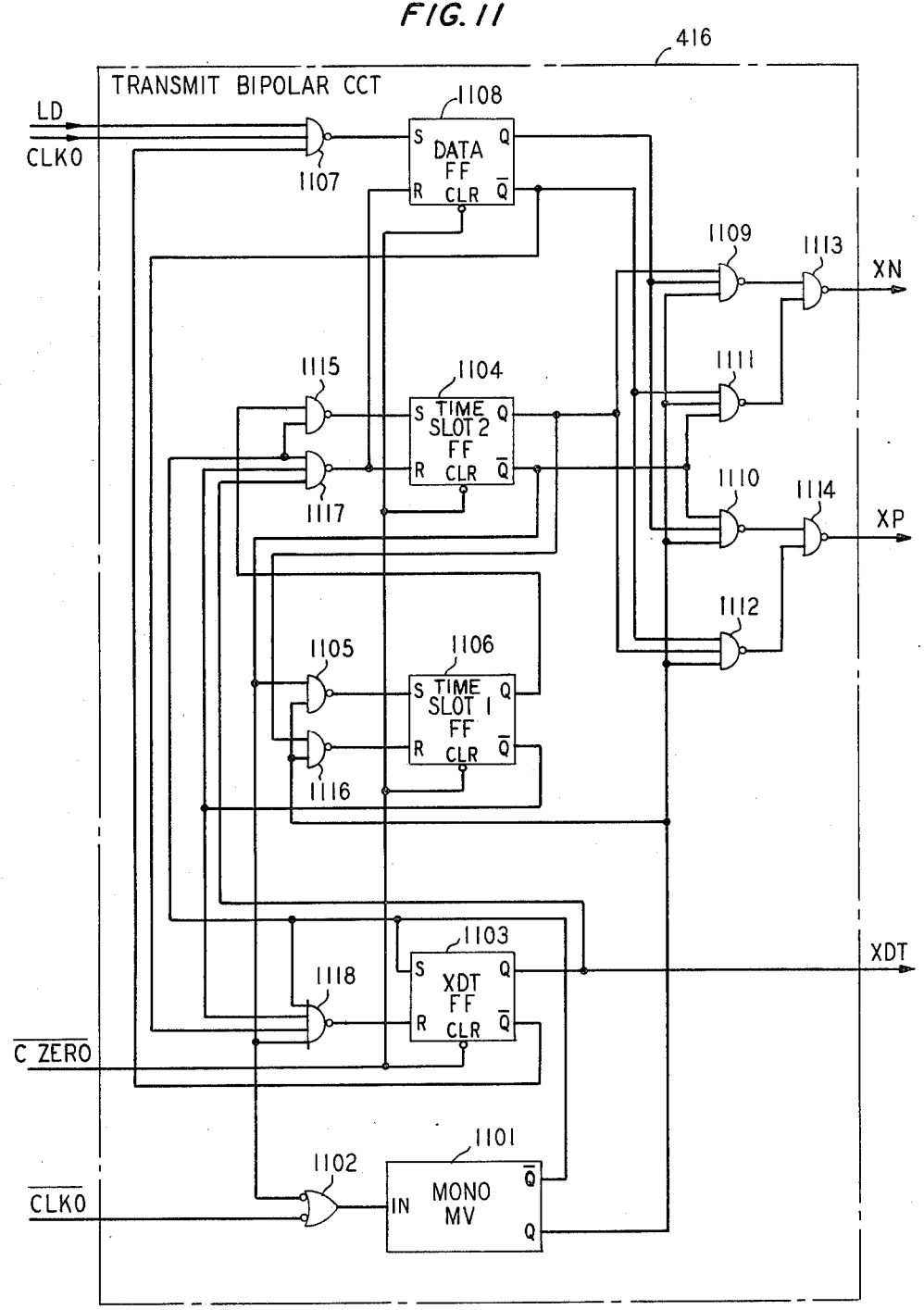
FIG. 11 shows a circuit for providing a bipolar doublet signal.

FIG. 11 shows a more detailed schematic of transmit bipolar circuit 416 of FIG. 4. The operation of transmit bipolar circuit 416 is described in conjunction with the associated timing diagrams shown in FIGS. 10 and 12. As shown by 1001 of FIG. 10 a gap (zero volt signal) is outputted on leads XP and XN during the counter state zero. Since transmit bipolar circuit 416 is activated for transmission by clock pulse CLKO, which occurs at the end of a counter state, an inherent one bit delay exists between the counter state associated with the waveform and the actual transmitted data XP-XN. Thus, during the end of counter state one the synchronous data bit is generated (D0 in the example of waveform XP-XN of FIG. 10) which is outputted on leads XP and XN during counter state two.

Figure 12:
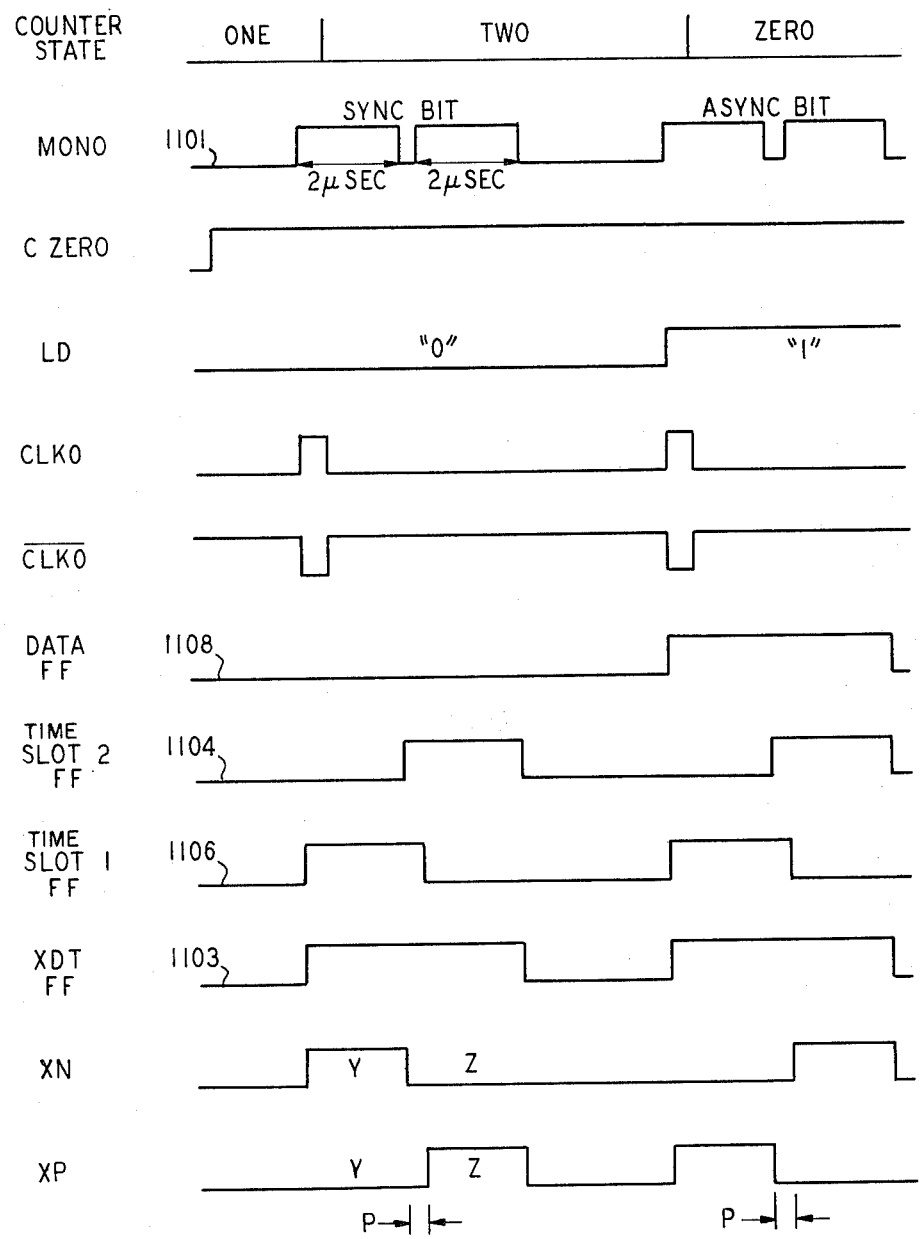
FIG. 12 shows the timing associated with the circuit of FIG. 11.

The operation of transmit bipolar circuit 416 of FIG. 11 begins with clock pulse $\overline{\text{CLKO}}$ triggering monostable 1101 through NOT OR gate 1102. The voltage waveforms associated with the circuits of FIG. 11 are shown in FIG. 12 and designated accordingly. Output $\overline{Q}$ of monostable 1101 sets flip-flop 1103. Output Q of monostable 1101 together with output $\overline{Q}$ of cleared flip-flop 1104 are connected via NAND gate 1105 to set time slot 1 flip-flop 1106. These transistions are shown by the respective timing diagrams of FIG. 12. Clock pulse CLKO together with lead LD and output $\overline{Q}$ of flip-flop 1103 are connected to NAND gate 1107 which sets data flip-flop 1108 if the data on lead LD is logic 1. With reference to XP-XN of FIG. 10 since the control bit "D0 frame bit" is logic 0, lead LD is logic 0 and data flip-flop 1108 of FIG. 11 remains cleared. Output Q of data flip-flop 1108 is connected to NAND gate 1109 and 1110 while output $\overline{Q}$ is connected to NAND gates 1111 and 1112. Output Q of time slot 2 flip-flop 1104 is connected to gates 1109 and 1112 while output Q is connected to gates 1110 and 1111. Output Q of flip-flop 1104 controls the second pulse of the doublet pulse shown by waveform XP-XN of FIG. 10 while output Q controls the first pulse. Referring to FIG. 11 again, output Q of monostable 1101 also connects to NAND gates 1109, 1110, 1111 and 1112. The outputs of gates 1109 and 1111 connect to NAND gate 1113 to generate output signal XN. The outputs of gates 1110 and 1112 connect to NAND gate 1114 to generate output signal XP. With control bit D0 at logic 0, data flip-flop 1108 remains cleared and output XN is logic 1 as determined by gates 1111 and 1113 (see time slot Y of waveform XN of FIG. 12). In a similar manner output XP is logic 0 as determined by gates 1110, 1112 and 1114 (see time slot Y of waveform XP of FIG. 12). Subtracting signal XN from signal XP generates the first pulse of the doublet for logic 0 shown by XP-XN of FIG. 10.

Returning to FIG. 11, monostable 1101 times out in a time period of approximately 2 μsec as determined by a capacitor and resistor time constant (not shown). When monostable 1101 times out the first pulse of the doublet ends and gates 1109 through 1112 are disabled. Time slot 2 flip-flop 1104 is set via NAND gate 1115 since Q of time slot 1 flip-flop 1106 is logic 1 and $\overline{Q}$ of monostable 1001 is logic 1. When time slot 2 flip-flop 1104 sets lead $\overline{Q}$ is logic 0 which retriggers monostable 1101 via NOT OR gate 1102. When output Q of monostable 1101 becomes logic 1 it is gated with the Q output of flip-flop 1104 through NAND gate 1116 to clear flip-flip 1106. Additionally, since lead Q of monostable 1101 and lead $\overline{Q}$ of flip-flop 1104 are both logic 1 gate 1110 enables output XP through gate 1114. Since the data on lead LD is logic 0 XN is logic 0 and XP is logic 1 during the second pulse of the doublet as shown at location Z of waveforms XN and XP of FIG. 12. Subtracting waveform XN from XP generates the waveform XP-XN shown in FIG. 10. Note since the time period P of FIG. 12 is actually very short the zero voltage level between the pulses of the doublet was not shown on waveform XP-XN of FIGS. 9 and 10.

Returning to FIG. 11 when monostable 1101 times out 2 μsec later the second pulse of the doublet ends and gates 1109 through 1112 are again disabled since output Q is logic 0 and gates 1117 and 1118 are enabled since output Q is logic 1. Additionally, since flip-flop 1103 is set and flip-flop 1106 is cleared NAND gate 1117 clears flip-flop 1104 and 1108. Note data flip-flop 1108 was never set and hence remains cleared. The output $\overline{Q}$ of flip-flop 1106, $\overline{Q}$ of data flip-flop 1108 and $\overline{Q}$ of flip-flop 1104 enable NAND gate 1118 to reset XDT flip-flop 1103 and hence lead XDT becomes logic 0.

With reference to FIG. 4, the asynchronous signal on lead 113 is gated to lead LD during counter state two in the following manner. When counter 102 reaches count two, lead ONE out of gate 421 is at logic 0 and multiplexer 303 and gate 106 of data multiplexer 105 are disabled. Gate 107 is enabled when lead TWO from flip-flop 403 becomes logic 1 thus gating the asynchronous signal on lead 113 through transmit bipolar circuit 416, line driver 423, coupler circuit 424 to leads XP and XN of line facility 111.

Referring to FIG. 12, the transmission of the asynchronous data bit results when a second clock pulse CLKO is generated during counter state two by NAND gate 414 of FIG. 4. The clock pulse $\overline{CLKO}$ retriggers monostable 1101 of the transmit bipolar circuit 416 shown in FIG. 11 resulting in the formation of a doublet pulse representing the asynchronous data bit. The operation of bipolar circuit 416 is identical to the operation previously described for the transmission of the synchronous data bit. As noted previously with reference to FIG. 9 the asynchronous data bit represents the logic level of the new asynchronous signal XMIT following a transition. Referring to FIG. 10 the asynchronous data bit is transmitted during counter state zero. At the conclusion of the transmission monostable 1101 times out and resets flip-flops 1103, 1104 and 1108 via gates 1118 and 1117.

Figure 13:
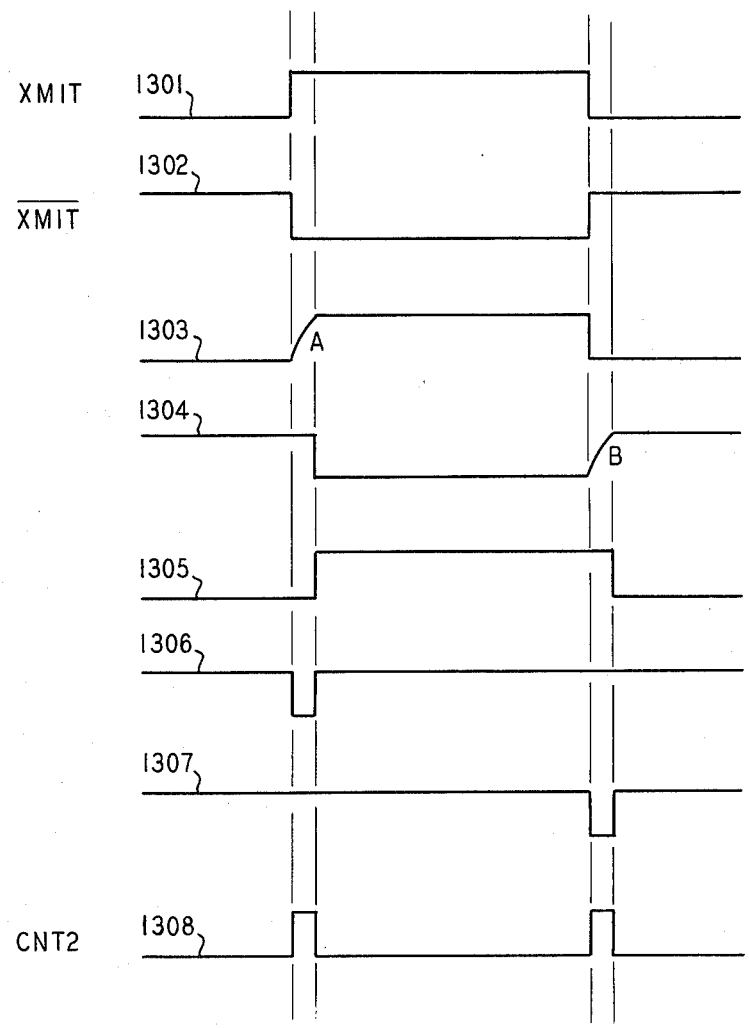
FIG. 13 shows the timing of the signals from the transition detector circuit.

With reference to FIG. 4 resynchronization signal CNT2 is generated using gates and inverters 425 through 436 as described herein with reference to the waveforms shown on FIG. 13. When in the asynchronous mode signal SYNC is at logic 0 thus disabling gate 428. Inverter 426 enables gate 427 enabling the (ASYNC INPUT) signal to be coupled to through NAND gate 429 (used as a NOT OR gate). The output of gate 429 connects to inverter 430 and gate 434. The output of inverter 430 connects to inverter 431 and gate 435 and has a signal which appears as shown by $\overline{XMIT}$ of FIG. 13. The output of inverter 431 connects to inverter 432 and to a small capacitor 437 which produces an approximate delay of about a tenth of a microsecond in the rise time (A) of the output of inverter 431 as shown by waveform 1303 of FIG. 13. The output of inverter 432 connects to inverter 433 and gate 434 as well as to a small capacitor 438 which produces an approximate delay of about a tenth of a microsecond in the rise time (B) of the output of inverter 432 as shown by waveform 1304 of FIG. 13. The output of inverter 433 connects to gate 435 and appears as shown by waveform 1305 of FIG. 13.

Gate 435 is disabled when lead $\overline{SYNC}$ is logic 0 which occurs when the interface is in the synchronous mode. During the asynchronous mode gate 435 is enabled and the waveforms 1305 and 1302 of FIG. 13 are combined in NAND gate 435 and produce the output waveform 1307 of FIG. 13. The waveforms 1301 and 1304 of FIG. 13 are combined in NAND gate 434 and produce the output waveform 1306 of FIG. 13. The NAND gate 436 combines waveforms 1307 and 1306 and produces waveform 1308 as a resynchronizing signal CNT2 and inverter gate 104 produces signal $\overline{CNT2}$ or RESET. Note that in the asynchronous mode signal CNT2 is shown by waveform 1308 where a pulse appears following each binary transition of the XMIT signal 1301. In a similar manner when the interface is in the synchronous mode resynchronizing signal CNT2 is generated only after each positive transition in the XCLK signal or a negative transition in the XCLKI signal.

With reference to FIG. 4, signal CNT2 is used to set the second bit flip-flop 404 to ensure that counter 102 counts to state two enabling an output data bit from either the XMIT, XCLK or XCLKI leads to sent over facility 111. Signal $\overline{CNT2}$ also resynchronizes monostable 405 of clock 101 insuring that the transmitted data bit associated with the XMIT, XCLK or XCLKI signal occurs 30 μsec after the detected transition. Thus, as shown by time A of FIG. 9 when XMIT goes from logic 1 to logic 0, counter 102 is reset to state zero again. As noted earlier the control signal, signal TR2, in the particular signal XP-XN example of FIG. 9, is outputted at the end of counter state one. Similarly, the data bit "0" ASYNC DATA associated with the new binary logic state 0 of lead XMIT is transmitted at the end of counter state two, some 30 μsec after the transition occurred in asynchronous signal XMIT. Note the minimum time between transition of the asynchronous signal XMIT is 30 μsec and hence the maximum frequency rate of the XMIT signal is approximately 32 KHz. Some time later, at time B of FIG. 9 a logic 0 to logic 1 binary transition occurs in signal XMIT. As shown by the counter state diagram at time B the signal XMIT transition has occurred during the time when the counter is at state one. Note no synchronous data SXMIT is outputted from multiplexer 105 and because pulse CNT2 resets clock 101 and counter 102 prematurely ending counter state zero. When counter 102 resets to state zero, inverter 420 and gate 419 generate a logic 0 on lead $\overline{CZERO}$. Referring to FIG. 11, with $\overline{CZERO}$ at logic 0 flip-flops 1103, 1104, 1106 and 1108 are cleared ending any synchronous data word transmission from transmit bipolar circuit 416 and through transmit line driver 423 and coupler circuit 424 to facility 111. Thus, when counter 102 reaches state one again a data word (see waveform XP-XN of FIG. 9) including bit SXMIT is outputted. Likewise 30 μsec later the new state (logic 1) of the asynchronous signal XMIT on lead 113 is transmitted following the transmission of synchronous bit SXMIT.

During the synchronous-master and synchronous-slave mode the respective signals XCLK and XCLKI would be synchronized with the synchronous signal generated by multiplexer 303 and counter 102 would not need to be reset. Since in the synchronous mode the ASYNC INPUT signal XMIT is the synchronous signal XCLK or XCLKI the resulting data word whether one bit or two bits long would be synchronous. Thus the gap between the data words would remain constant and the counter states shown in FIG. 9 would be of uniform duration. Each transition of signal XCLK and XCLKI from logic 0 to logic 1 would then add a second bit to the next transmitted data word.

Receiver Circuit FIGS. 6 and 7

The basic receiver circuit of interface 201 is shown in FIG. 2. The major parts of the receive unit include receive circuit 206, gap detector 207, pointer 208, data flip-flop 209, control register 210, control buffer 212, comparator 211, phase detector 213 and mode switch 215.

Figure 15:
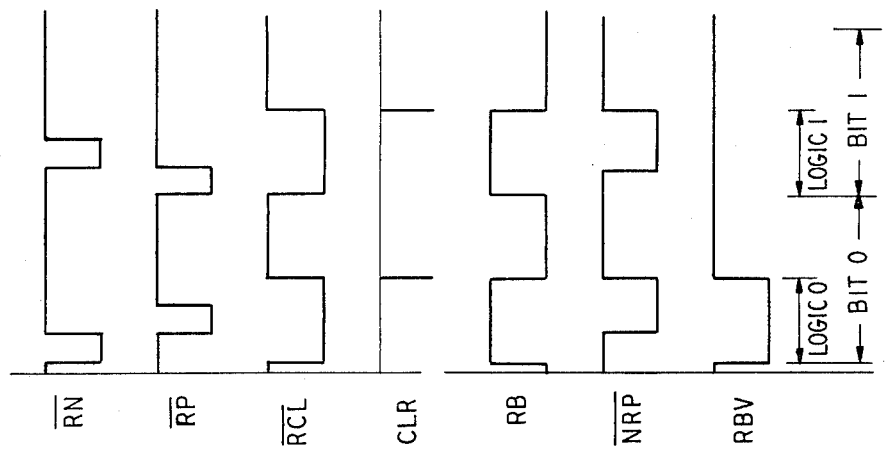
FIG. 15 shows the timing associated with the circuit of FIG. 14.
Figure 14:
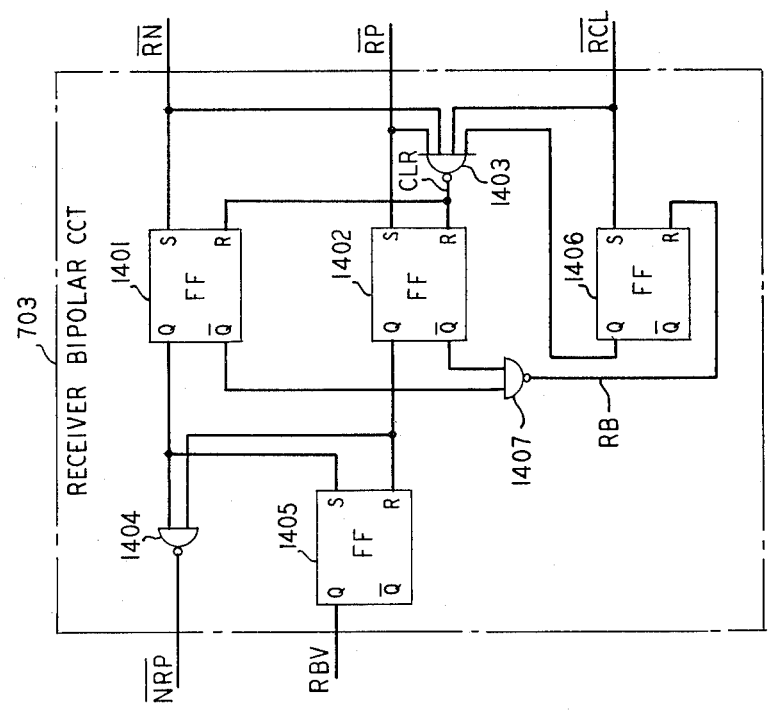
FIG. 14 shows a circuit for receiving a bipolar doublet signal.

With reference to FIGS. 6 and 7, when a doublet pulse, of the type shown by waveform XP-XN of FIG. 9, arrives across receive pair $\overline{RP}$ and $\overline{RN}$ (facility 117) it is coupled through line coupler 701 to line receiver 702. As shown on FIG. 14 the inverted outputs $\overline{RP}$ and $\overline{RN}$ of line receiver 702 are inputted to flip-flops 1401 and 1402. With reference to FIG. 15, waveforms RN and RP depict a logic 0 doublet signal being received in bit position 1 of a received data word. Signal $\overline{RN}$ connects to input S of flip-flop 1401 and to gate 1403. Signal $\overline{RP}$ connects to the input S of flip-flop 1402 and to gate 1403. The Q outputs of flip-flops 1401 and 1402 connect to NAND gate 1404 and connect, respectively, to the set S and reset R leads of flip-flop 1405. Assuming that flip-flops 1401 and 1402 are in the reset state, output lead RBV is held at logic 1 by the Q output of flip-flop 1401. In the following description concurrent references are made to FIG. 14 and FIG. 15. Assuming a logic 0 is received on leads $\overline{RP}$ and $\overline{RN}$ of flip-flop 1401 sets before flip-flop 1402. When flip-flop 1401 sets output Q of flip-flop 1402 resets flip-flop 1405 and lead RBV becomes logic 0. Lead RBV at logic 0 represents a logic 0 data signal received over facility 117. Output $\overline{NRP}$ of NAND gate 1404 becomes logic 0 as soon as flip-flop 1402 sets.

Referring to FIG. 7, lead $\overline{NRP}$ triggers monostable 704 and lead $\overline{RCL}$ becomes logic 0. Returning to FIG. 14, lead $\overline{RCL}$ sets flip-flop 1406 and disables gate 1403. Output Q of flip-flop 1406 connects to an input of gate 1403. When monostable 704 of FIG. 7 times out, approximately 5μ seconds later, lead $\overline{RCL}$ becomes logic 1. Since RN, RP, and Q of flip-flop 1406 are at logic 1, the output CLR of gate 1403 becomes logic 0 when RCL becomes logic 1. Output CLR of gate 1403 resets flip-flop 1401 and 1402. When flip-flops 1401 and 1402 are reset their $\overline{Q}$ outputs become logic 1 and cause the output RB of NAND gate 1407 to become logic 0. The output Q of flip-flop 1402 also resets flip-flop 1405 and lead RBV becomes logic 0. A logic 0 on lead RB resets flip-flop 1406 and hence its output Q becomes logic 0. Gate 1403 is disabled by the logic 0 on lead Q of flip-flop 1406 and lead CLR becomes logic 1 again. Thus, the logic 0 pulse on lead CLR, shown in FIG. 15, is very narrow and is determined by the above described gate delays.

Since flip-flops 1401 and 1402 are reset, lead $\overline{NRP}$ becomes logic 1 and remains at this level until both $\overline{RN}$ and $\overline{RP}$ become logic 0 at the reception of the next bit of data.

As shown on FIG. 15 the next doublet pulse has signal $\overline{RP}$ going to logic 0 prior to lead $\overline{RN}$ indicating the reception of a logic 1 signal over facility 117. Since flip-flop 1402 sets prior to flip-flop 1403, flip-flop 1405 remains set and lead RBV remains at logic 1 indicating that a logic 1 signal has been received. Lead $\overline{NRP}$ goes to logic 0 when signal $\overline{RN}$ becomes logic 0 causing lead RCL to go to logic 0. Again lead $\overline{RCL}$ remains at logic 0 for approximately 5μ seconds allowing sufficient time for signal RBV to be outputted. When $\overline{RCL}$ returns to logic 1, gate 1403 generates a logic 0 pulse on lead CLR which resets flip-flops 1401 and 1403 of receiver bipolar circuit 703. The receiver bipolar circuit 703 then awaits the reception of additional data words on leads RP and RN.

Referring to FIG. 7, after the second pulse of the doublet is received a logic 0 pulse $\overline{NRP}$ is generated indicating that the received data on lead RBV is valid data. The output Q of monostable 704 gates a 5 μsec logic 1 pulse signal to inverter 705. Inverter 705 is connected to capacitor 706 and inverter 707 which provides a clock pulse slightly longer than 5 μsec to type D flip-flops 708 through 711 of pointer circuit 208. Output $\overline{NRP}$ of bipolar circuit 703 also connects to monostable 730 of gap detector 207 which provides a positive pulse of approximately 14 μsec duration on lead 2Q which is connected to lead CLR of flip-flops 408, 409, 410 and 411.

The following operating description of pointer circuit 208 references both FIG. 6 and FIG. 7. When a data bit is received a positive pulse from inverter 707 clocks flip-flop 708 to the set condition generating clock pulse CCLK. At this time the data on lead RBV is transferred, by clock lead CCLK, to shift register 613 of control register 210. With reference to FIG. 9 when each received data word, as shown by waveform XP-XN, is comprised of only a synchronous data bit, such as during the time other than at times A and B, this data bit is transferred to register 613. As previously noted the time period between the 4 μsec doublet pulse of the current data word and the 4 μsec doublet pulse of the next data word is 20 μsec. This time between doublet pulses includes the gap time. The time period between the end of the doublet pulse of the current data word and the beginning of the doublet pulse of the next data word is then approximately 16 μsec. However, when a two bit word is received the time period between doublet pulses is only 10 μsec.

With reference to FIG. 7, gap detector 207 includes a retriggerable monostable 730 which is triggered on the reception of each doublet pulse via lead $\overline{NRP}$. Thus, once gap detector 207 is triggered if another trigger pulse does not occur within 14 μsec, the end of a data word must have occurred and output 20 goes to logic 0 and clears flip-flops 708 through 711 of pointer circuit 208. When the next synchronous data bit is received the above process repeats itself. The above operation of the gap detector 207 and pointer circuit 208 functions as a demultiplexing circuit. Gap detector 207 separates the words of the received data stream, while pointer circuit 208 separates the synchronous control bits from the asynchronous data bits.

When a second data bit follows the asynchronous control bit as during a two bit word transmission (time A of FIG. 9), gap detector 207 is retriggered by pulse $\overline{NRP}$ before it times out and output 2Q of circuit 412 remains at logic 1. This retriggering occurs since the second data bit is received within 14 μsec of the synchronous data bit. Thus, flip-flop 708 is not cleared and hence no clock pulse appears on lead CCLK. Consequently, the second data bit is not loaded into synchronous bit register 613. Flip-flop 709 is set by the logic 1 on clock lead CCLK and the clock pulse from inverter 707. The clock pulse DCLK on lead 2Q of flip-flop 709 goes to logic 1 when the output of inverter 707 pulses high during the reception of the second data bit of a two bit data word. Clock pulse DCLK causes the second data bit on lead RBV to be stored in data flop 209. Since the time period between the second data bit and the next received control bit of the next data word is greater than 14 μsec, monostable 730 times out and flip-flops 708 through 711 are cleared.

Flip-flops 710 and 711 or output 1Q of monostable 740 provide an optional shut down capability when wired through switch 714. When switch 714 is connected to lead $\overline{4Q}$ of flip-flop 711, the receiver has a shut down capability which requires four consecutive data bits which are separated less than 14 μsec apart (i.e., a 4 bit data word) to effectuate the shut down. Lead $\overline{4Q}$ of flip-flop 711 which is normally at logic 1 becomes a logic 0 after the reception of four consecutive data bits. Lead $\overline{4Q}$ would then clear synchronous control bit registers 613, 615 and data register 616 and flip-flop 617. When switch 714 is connected to lead 1Q of monostable 740 a shut down capability exists which requires the absence of data for an extended period of time as determined by the time constants of monostable 740. When lead 1Q of monostable 740 goes to logic 0 after the absence of received data shift registers 613, 615 and data register 616 and flip-flop 617 are cleared via lead CRST.

As noted in a previous paragraph gap detector 207 and pointer circuit 208 serve to demultiplex the receive bit stream which contains one and two bit words each preceded by a gap. When a series of one bit data words are received gap detector 207 clears pointer circuit 208 preventing the outputting of clock pulse DCLK. Thus each received word generates another clock pulse CCLK causing the received synchronous input control bits to be loaded into registers 613 and 615. As noted earlier, the received synchronous input control bits are the control signals multiplexed by multiplexer 205 of FIG. 2. Since these control signals are slow varying the control bits change state no sooner than in every other frame, thus providing redundant data words in consecutive frames.

With reference to FIG. 6, control register 210 consists of two 8 bit shift registers 613 and 615 which connect to clock pulse CCLK. Data lead RBV from receive circuit 206 connects to the input data leads INA and INB of shift register 613 and the output data lead QH of shift register 613 connects to input data leads INA and INB of shift register 615. As noted previously a common clear lead CRST between the shift registers 613 and 615 clears the registers when certain data conditions exist.

The bit output leads QH through QE of both shift register 613 and 615 are connected to the input leads of comparator 618 which has output leads A=B, A>B, A<B connected to input leads A=B, A>B and A<B of comparator 619. Comparator 619 compares, in a well known manner, input leads QA through QD of shift register 615 with output leads QA through QD of shift register 613. Note that output lead QA of shift register 613 connects through inverter 620 before connecting to lead A of comparator 619. Referring to FIG. 9, we recall that the logic level of the frame bit FRAME toggles every eight control bits as shown by the waveform XP-XN. Returning to FIG. 6 inverter 620 inverts the frame bit appearing at output lead QA of shift register 613 for comparison with output on lead QA of shift register 615. When a valid comparison exists in comparator 618 only lead A=B is logic 1 otherwise it is logic 0 and either lead A>B or A<B is logic 1. When output A=B of comparator 618 is logic 1 and a valid comparison exists in comparator 619 output lead A=B of comparator 619 becomes logic 1. This lead connects to and clocks data register 616 and flip-flop 617 to store the data on leads QB through QH of shift register 615. Thus, only when bit QA of shift register 613 is the inverse of bit QA of shift register 615 and when the data at bits QB through QH of shift register 613 identically match the bits QB through QH of shift register 615 is the output A=B of shift register 613 at logic 1. Lead A=B of comparator thus becomes logic 1 when both a valid toggling has occurred in the frame bit and identical data words (identical control bits) have been received in adjacent frames.

This concept of using identical data words of a data transmission to detect both framing and a valid data reception is the subject of my copending patent application filed concurrently with this application.

Note, that every other frame of the received synchronous control data is outputted to the user. This is implemented by loading data in register 616 and flip-flop 617 from shift register 615. Outputs of data register 616 are inverted to the proper logic state by inverter unit 620 and are connected to RS232 driver 621. This RS232 driver converts 5 volt TTL logic to RS232 logic levels for connection to the connected terminal (Term T) or modem (Term M).

With reference to FIG. 2 and as noted in an earlier paragraph, the asynchronous data is loaded into data flip-flop 209 using clock pulse DCLK. The output of flip-flop 209 designated RCV also connects to line driver 621 for output as signal XMIT in the asynchronous mode.

Clock signal DCLK which is outputted from pointer circuit 208, when a second data bit of a two bit word is received also connects to D type flip-flop 724 of phase detector circuit 213 of FIG. 7. Phase detector circuit 213 is required for operation with synchronous terminals. Flip-flop 724 has its $\overline{Q}$ lead connected to its D input to enable a toggle action. The square wave output on lead Q of flip-flop 724 is integrated using the RC circuit 725 and amplifier 726. The RC time constant results in the output of amplifier 726 being delayed by one half of the width of the square wave on lead Q of flip-flop 724. Exclusive OR gate 427 combines the output on lead Q of flip-flop 724 with the delayed output of amplifier 726 resulting in a doubling of the frequency of the original square wave. Note referring to waveform XP-XN of FIG. 10 we recall that in the synchronous mode the positive transitions of the clock XCLKI or XCLK are transmitted as the second bit of a data word. Clock phase detector circuit 213 thus recreates the XCLKI or XCLK clock signal inputted to the transmitter portion of interface 201. Output of gate 727 is gated through NAND gate 728 to produce clock signal RCLK only during the synchronous-slave mode. Master clock signal $\overline{MCLK}$ together with signal SYNC are used to gate the output of gate 727 through NAND gate 729 to produce signal XCLKI. Signal XCLKI occurs only during the synchronous-master clock mode when the swinger of switch SW1 is at +5 volts and the swinger of switch SW2 is at 0 volts. Outputs XLCKI and RCLK are both connected to RS232C driver 621 of FIG. 6.

The integrated circuits utilized in the design of Interface 201 are well known circuits and typical commercially available types are listed below:

TABLE 1

| Component Designation | Commercial Circuit |
|---|---|
| | Texas Instruments, Inc. |
| 704, 712 | SN74123 |
| 724, 617 | SN74C74 |
| 705, 620 | SN74C04 |
| 728, 429 | SN74C00 |
| 435 | SN74C10 |
| 303 | SN74C151 |
| 427 | SN7486 |
| 613 | SN74C164 |
| 618 | SN74C85 |
| 616 | SN74C174 |
| 302 | SN74C193 |
| | Motorola, Inc. |
| 621 | MC1489 |
| 304 | MC1488 |
| 318 | 129P |

What has been described is illustrative of the invention. Other embodiments known to those skilled in the art could provide similar functions without deviating from the scope of the disclosed invention.

I claim:

1. A circuit arranged to multiplex an asynchronous binary data input signal with a synchronous binary data input signal such that the binary transition timing of said asynchronous binary data input signal is preserved at the output of said circuit
CHARACTERIZED IN THAT
said circuit comprises:
means for providing at said circuit output at timed intervals said synchronous data input signal as a binary data word having a fixed number of data bits,
means for detecting a binary transition in said asynchronous binary data input signal, and
means controlled by said detecting means for both adjusting a next one of said timed intervals and for inserting an extra data bit in a next one of said provided output data words.

2. The invention as described in claim 1
CHARACTERIZED IN THAT
said interval adjusting means comprises:
means for delaying said next timed interval a fixed time period after a binary transition in said asynchronous input signal.

3. The invention as described in claim 2
CHARACTERIZED IN THAT
said interval adjusting means comprises:
means controlled by said delaying means for multiplexing said extra data bit in said next one of said provided output data words.

4. The invention as described in claim 2
CHARACTERIZED IN THAT
said delaying means comprises:
a clock means,
means for counting a signal from said clock means, and
means controlled by said detecting means for resetting both said clock means and said counting means.

5. The invention as described in claim 4
CHARACTERIZED IN THAT
said interval adjusting means comprises:
means controlled by said counting means for multiplexing said extra data bit in said next one of said provided output data words.

6. The invention as described in claim 1
CHARACTERIZED IN THAT
said interval adjusting means of said transmitter comprises:
means for producing a binary clock signal, said clock signal arranged to resynchronize in response to a control signal from said detecting means,
a variable counter means connected to said providing means, clock signal means and said control signal of said detecting means, said counter means arranged to cyclically count said clock signals to a first count level in the absence of said control signal, said counter means arranged to reset and count to a higher second count level in response to said control signal from said detecting means, said counter means arranged to enable said means for providing said synchronous data signal during counts of said counter means up to said first count level, and said counter means arranged to enable insertion of said extra bit during subsequent counts higher than said first count level until said counter means reaches said second count level.

7. A transmitter unit of a digital communication system and arranged to multiplex an asynchronous binary data input signal with a synchronous binary data input signal such that the binary transition timing of said asynchronous binary data input signal is preserved during the transmission of a data word from said transmitter unit
CHARACTERIZED IN THAT
said transmitter comprises:
means for transmitting said synchronous data input signal as a binary data word,
means for detecting a binary transition in said asynchronous binary input signal and for generating an output signal in response thereto,
means for timing a transmission of said data word a fixed amount of times after the reception of said output signal from said detector means, and
means connected to said transmitting means for inserting an extra data bit in said transmitted data word in response to said output signal, said extra bit representing said binary transition timing of said asynchronous binary data input signal transmission to said receiver unit.

8. A communication system including a transmitter unit and a receiver unit, said transmitter unit arranged to multiplex an asynchronous binary data input signal with a synchronous binary data input signal for transmission as a data word to said receiver unit such that the binary transition timing of said asynchronous binary data input signal is preserved after demultiplexing by said receiver unit

CHARACTERIZED IN THAT said transmitter comprises:
means for transmitting at timed intervals said synchronous data input signal as a binary data word having a fixed number of data bits,
means for detecting a binary transition in said asynchronous binary data input signal, and
means controlled by said detecting means for both adjusting a next one of said timed intervals and for inserting an extra data bit in a next one of said transmitted data word.

9. The invention as described in claim 8

CHARACTERIZED IN THAT said interval adjusting means comprises:
means controlled by said detector means for delaying said next timed interval a fixed time period after a binary transition in said asynchronous input signal.

10. The invention as described in claim 9

CHARACTERIZED IN THAT said delaying means comprises:
a clock means,
means for counting a signal from said clock means, and
means controlled by said detecting means for resetting both said clock means and said counting means.

11. The invention as described in claim 10

CHARACTERIZED IN THAT said bit inserting means comprises:
means controlled by said counting means for multiplexing said extra data in said transmitted data word.

12. The invention as described in claim 10

CHARACTERIZED IN THAT said interval adjusting means of said transmitter comprises:
means for providing a binary clock signal, said clock signal arranged to resynchronize in response to a control signal from said detecting means,
a variable counter means connected to said transmitting means, said clock signal means and said control signal of said detecting means, said counter means arranged to cyclically count said clock signals to a first count level in the absence of said control signal, said counter means arranged to reset and count to a higher second count level in response to said control signal from said detecting means, said counter means arranged to permit transmission of said synchronous data signal during counts of said counter means up to said first count level, and said counter means arranged to transmit said extra bit during subsequent counts higher than said first count level until said counter means reaches said second count level.

13. A communication system including a transmitter unit and a receiver unit, said transmitter unit arranged to multiplex an asynchronous binary data input signal with a synchronous binary data input signal for transmission as a data word to said receiver unit such that the binary transition timing of said asynchronous binary data input signal is preserved after demultiplexing by said receiver unit

CHARACTERIZED IN THAT said transmitter comprises:

means for transmitting said synchronous data input signal as a binary data word,
means for both detecting a binary transition in said asynchronous binary data input signal and for generating a control signal in response thereto,
means for timing a transmission of said data word a fixed amount of time after the reception of said control signal from said detector means, and
means connected to said transmitting means for inserting an extra data bit in said transmitted data word in response to said control signal, said extra bit representing said binary transition timing of said asynchronous binary data input signal during transmission to said receiver unit.

14. A transmitter unit for use in a communication system, said transmitter unit arranged to concurrently transmit synchronous and asynchronous data

CHARACTERIZED IN THAT said transmitter unit comprises:
means for accepting a synchronous binary data input signal;
means for accepting an asynchronous binary data input signal;
means connected to said asynchronous data accepting means for generating an output signal in response to the detection of a transition in the binary state of said asynchronous data input signal; and
means connected to said synchronous accepting means, asynchronous accepting means and said generating means for transmitting data, said transmitting means including
means for synchronously transmitting data from said synchronous accepting means in the absence of said output signal from said generating means, and
means for asynchronously transmitting a combined data signal from said synchronous accepting means and said asynchronous accepting means in response to said output signal from said generating means such that the timing between consecutive asynchronous transmissions represent the timing of the transitions in said asynchronous data input signal.

15. The invention as described in claim 14

CHARACTERIZED IN THAT said synchronous data transmitting means includes means for producing a start sequence which precedes the transmission of said synchronous data input signal,
means for controlling the number of said data transmission from said synchronous transmitting means, and
means for maintaining the timing between said synchronous binary data input signal and said synchronous transmitting means; and
said asynchronous timing means includes
means for combining said asynchronous data input signal with said synchronous data input signal for a concurrent data transmission by said transmitter unit,
means for modifying said bit number controlling means to enable said concurrent data transmission,
means for altering the timing of said timing means such that said timing between consecutive asynchronous transmissions is equal to the timing between transitions in said asynchronous data input signal.

16. A communication system including a transmitter unit and a receiver unit, said transmitter unit arranged to combine an asynchronous and a synchronous binary input signal for communication as a data word to said receiver unit

CHARACTERIZED IN THAT said transmitter unit of said communication system comprises:

means for accepting a synchronous binary data input signal;

means for accepting an asynchronous binary data input signal;

means connected to said asynchronous data accepting means for generating an output signal in response to the detection of a transition in the binary state of said asynchronous data input signal; and means connected to said synchronous accepting means, asynchronous accepting means and said generating means for transmitting data, said transmitting means including means for synchronously transmitting data from said synchronous accepting means in the absence of said output signal from said generating means, and means for asynchronously transmitting a combined data signal from said synchronous accepting means and asynchronous accepting means in response to said output signal from said generating means such that the timing between consecutive asynchronous transmissions represent the timing of the transitions in said asynchronous data input signal.

17. The invention as described in claim 16

CHARACTERIZED IN THAT said synchronous data transmitting means includes means for producing a start sequence which precedes the transmission of said synchronous data input signal, means for controlling the number of bits of said data transmission from said synchronous transmitting means, and means for maintaining the timing between said synchronous binary data input signal and said synchronous transmitting means; and said asynchronous timing means includes means for combining said asynchronous data input signal with said synchronous data input signal for a concurrent data transmission by said transmitter unit, means for modifying said bit number controlling means to enable said concurrent data transmission, means for altering the timing of said timing means such that said timing between consecutive asynchronous transmission is equal to the timing between transition in said asynchronous data input signal.

18. A transmitter unit for use in a digital communication system, said unit arranged to combine synchronous and asynchronous binary data signals for transmission over a connected data facility such that the binary transition information of said asynchronous binary data signal is preserved during transmission

CHARACTERIZED IN THAT said transmitter unit comprises:

means for accepting a synchronous binary data signal;

means for accepting an asynchronous binary data signal;

means connected to said asynchronous data accepting means for generating an output signal in response to the direction of a transition in the binary state of said asynchronous data signal;

means for providing a binary clock signal, said clock arranged to resynchronize in response to an output signal from said generating means;

a variable counter means connected to said clock signal means and said generating means, said counter means arranged to cyclically count said clock signals to a first count level in the absence of an output signal from said generating means, said counter means arranged to reset and count to a higher second count level in response to said output signal from said generating means; and means connected to said synchronous data means, said asynchronous data means and said variable counter means for gating data signals as a data word for transmission over said facility wherein said gating means includes means for gating said synchronous binary signal during counts of said counter means up to said first count level, and means for gating said asynchronous binary signal during subsequent counts higher than said first count level until said counter means reaches said second count level.

19. The invention as described in claim 18

CHARACTERIZED IN THAT said transmitter unit further comprises means for multiplexing multiple input signals into a synchronous data input signal.

20. The invention as described in claim 19

CHARACTERIZED IN THAT said transmitter unit further comprises:

means for generating a framing signal as one of said multiple input signals.

21. The invention as described in claim 20

CHARACTERIZED IN THAT said gating means of said transmitter unit further comprises:

means for generating a start sequence which prepends to each transmitted data word.

22. The invention as described in claim 21

CHARACTERIZED IN THAT said transmitter unit further comprises:

means connected between said gating means and said facility for transmitting a doublet signal representation of each data bit of said data word.

23. A communication system including a transmitter unit and a receiver unit, said transmitter unit arranged to combine an asynchronous and a synchronous binary input signal for communication as a data word to said receiver unit such that the binary transition information of said asynchronous signal is preserved when decoded by said receiver unit

CHARACTERIZED IN THAT said transmitter unit comprises:

means for accepting a synchronous binary data signal;

means for accepting an asynchronous binary data signal;

means connected to said asynchronous data accepting means for generating an output signal in response to the detection of a transition in the binary state of said asynchronous data signal;

means for providing a binary clock signal, said clock arranged to resynchronize in response to an output signal from said generating means;

a variable counter means connected to said clock signal means and said generating means, said counter means arranged to cyclically count said clock signals to a first count level in the absence of an output signal from said generating means, said counter means arranged to reset and count to a higher second count level in response to said output signal from said generating means; and means connected to said synchronous data means, said asynchronous data means and said variable counter means for gating data signals as a data word for communication over said facility wherein said gating means includes means for gating said synchronous binary signal during counts of said counter means up to said first count level, and means for gating said asynchronous binary signal during subsequent counts higher than said first count level until said counter means reaches said second count level.

24. The invention as described in claim 23
CHARACTERIZED IN THAT
said receiver unit comprises:
means for determining if a received data word includes an asynchronous data bit,
means for separating said asynchronous data bits from said synchronous data bits in said received data word, and
means for reconstructing said asynchronous data signal from said asynchronous data bit.

25. The invention as described in claim 24
CHARACTERIZED IN THAT
said receiver unit further comprises:
means for framing said received data word from the separating synchronous data bits.

26. The invention as described in claim 23
CHARACTERIZED IN THAT
said receiver unit further comprises:
means for validating the reception of synchronous data bits by comparing consecutive frames of synchronous data bits.

27. The invention as described in claim 23
CHARACTERIZED IN THAT
said transmitter unit further comprises means for multiplexing multiple input signals into a synchronous data input signal, and
said receiver unit further comprises means for demultiplexing said synchronous data word into multiple output signals.

28. The invention as described in claim 27
CHARACTERIZED IN THAT
said transmitter unit further comprises:
means for generating a framing signal as one of said multiple input signals.

29. The invention as described in claim 23
CHARACTERIZED IN THAT
said data gating means of said transmitter unit further comprises:
means for generating a start sequence which prepends to each data word, and
said receiver unit further comprises:
means for detecting said start sequence on each received data word.

30. The digital communication system of claim 29
CHARACTERIZED IN THAT
said transmitter unit further comprises:
means connected between said gating means and said facility for transmitting a doublet signal representation of each data bit of said data word, and
said receiver unit further comprises:
means connected to said facility for decoding each said doublet signal into a binary data bit.

31. A communication system including a transmitter unit and a receiver unit, said transmitter unit arranged to multiplex an asynchronous and a synchronous binary input signal for communication as a data word to said receiver unit, said communication system
CHARACTERIZED IN THAT
said transmitter unit of said communication system includes
means for transmitting at timed intervals said synchronous data input signal as a binary data word having a fixed number of data bits,
means for detecting a binary transition in said asynchronous binary data input signal, and
means controlled by said detecting means for both adjusting a next one of said timed intervals and for inserting an extra data bit in a next one of said transmitted data words; and
said receiver unit of said communication system includes
means for determining an increase in the number of bits in a received multiplexed data word, and
means controlled by said determining means for demultiplexing said received multiplexed data into a synchronous data part and an asynchronous data part such that said asynchronous data is provided at an output a fixed time period after the beginning of reception of said received multiplexed data words.

32. A receiver unit for use in a communication system, said receiver arranged to receive an asynchronous multiplexed data word including one part consisting of a fixed number of bits of synchronous data and another part consisting of a fixed number of bits of asynchronous data
CHARACTERIZED IN THAT
said receiver unit comprises:
means for determining an increase in the number of bits in a received asynchronous multiplexed data word, and
means controlled by said determining means for demultiplexing said received asynchronous multiplexed data into said synchronous data part and asynchronous data part such that said asynchronous data is provided at an output a fixed time period after the beginning of reception of said received multiplexed data word.

33. The invention as described in claim 32
CHARACTERIZED IN THAT
said determining means comprises:
means for timing the interval between the received data words.

34. The invention as described in claim 33
CHARACTERIZED IN THAT
said timing means comprises:
a retriggerable monostable means arranged to time out between the reception of data words, said monostable means retriggered by the reception of each data bit of a received data word.

35. The invention as described in claim 34
CHARACTERIZED IN THAT
said demultiplexing means comprises:
means controlled by said determining means for producing separate load pulses for said synchronous data part and for said asynchronous data part,
means controlled by a synchronous load pulse for storing said sycnhronous data part, and
means controlled by an asynchronous load pulse for storing said asynchronous data part.

36. In a circuit, a method of multiplexing an asynchronous binary data input signal with a synchronous binary data input signal for transmission as part of a data word which preserves the timing of said asynchronous binary data input signal, the method comprising the steps of:
  (a) transmitting said synchronous data at timed intervals as a binary data word having a fixed number of bits;
  (b) detecting a binary transition in said asynchronous data input signal;
  (c) adjusting the timed intervals of the transmission of the binary data word of step (a) to have a fixed time relationship to the timing of the detection of the binary transition of step (b); and
  (d) inserting an extra data bit in the transmission of the binary data word of step (a) in response to the detection of the binary transition of step (b).

37. In a data transmission circuit a method of multiplexing a data bit of an asynchronous digital data input signal with a data bit of a synchronous digital data input signal for transmission as part of a data word which preserves the timing of said asynchronous data signal, the method comprising the steps of:
  (a) counting a clock signal in a cyclic counter which determines the number of bits of each transmitted data word;
  (b) gating said synchronous data bits as part of the data word;
  (c) generating an output signal indicating the transition of said asynchronous binary data signal;
  (d) resetting the clock and cyclic counter in response to the output signal to step (a);
  (e) increasing the counting range of the cyclic counter of step (a) in response to the output signal of step (c); and
  (f) gating the asynchronous extra data bit as part of the lengthened data word creased by the increased counting range of step (e).

38. In a receiver circuit a method of demultiplexing a received asynchronous multiplexed binary data word including one part containing a fixed number of bits of synchronous data and another part consisting of a fixed number of bits of asynchronous data, the method comprising the steps of:
  (a) determining an increase in the number of bits in the received binary data word; and
  (b) demultiplexing in response to the determination made in step (a) the received data word into synchronous data and asynchronous data such that the asynchronous data is outputted a fixed timed period after the beginning of the reception of said received asynchronous multiplexed data word.

39. In a data transmission system a method of transmitting an asynchronous binary data input signal with a synchronous binary data input signal for transmission as part of a data word which preserves the timing of said asynchronous binary data input signal, the method comprising the steps of:
  (a) transmitting said synchronous data at timed intervals as a binary data word having a fixed number of bits;
  (b) detecting the binary transition in said asynchronous data input signal;
  (c) adjusting the timed intervals of the transmission of the binary data word of step (a) to have a fixed time relationship to the timing of the detection of the binary transition of step (b);
  (d) inserting an extra data bit in the transmission of the binary data word of step (a) in response to the detection of the binary transition of step (b);
  (e) determining an increase in the number of bits in the received binary data word; and
  (f) demultiplexing in response to the determination made in step (e) the received data word into synchronous data and asynchronous data such that the asynchronous data is outputted a fixed time period after the beginning of the reception of said received multiplexed binary data word.

* * * * *